United States Patent [19]

Longacre, Jr. et al.

[11] Patent Number: 5,723,853
[45] Date of Patent: Mar. 3, 1998

[54] BAR CODE READER

[75] Inventors: Andrew Longacre, Jr., Skaneateles; Robert M. Hussey, Syracuse, both of N.Y.

[73] Assignee: Welch Allyn, Inc., Skaneateles Falls, N.Y.

[21] Appl. No.: 813,870

[22] Filed: Mar. 7, 1997

Related U.S. Application Data

[63] Continuation of Ser. No. 371,037, Jan. 10, 1995, abandoned.
[51] Int. Cl.⁶ .................................................. C06K 7/10
[52] U.S. Cl. ........................................... 235/472; 235/462
[58] Field of Search ................................. 235/462, 472, 235/436, 494, 470; 250/208.1, 221

[56] References Cited

U.S. PATENT DOCUMENTS

| | | | |
|---|---|---|---|
| 4,075,461 | 2/1978 | Wu et al. | 235/462 |
| 4,251,798 | 2/1981 | Swartz et al. | 235/462 |
| 4,289,957 | 9/1981 | Neyroud et al. | 235/462 |
| 4,782,220 | 11/1988 | Shuren | 235/462 |
| 4,794,239 | 12/1988 | Allais | 235/462 |
| 4,825,057 | 4/1989 | Swartz et al. | 235/462 |
| 4,835,713 | 5/1989 | Pastor | 235/462 |
| 4,893,333 | 1/1990 | Baran et al. | 235/462 |
| 4,973,829 | 11/1990 | Ishida et al. | 235/462 |
| 5,113,445 | 5/1992 | Wang | 235/462 |
| 5,138,140 | 8/1992 | Siemiatkowski et al. | 235/462 |
| 5,159,635 | 10/1992 | Wang | 235/462 |
| 5,196,686 | 3/1993 | Leister | 235/462 |
| 5,208,449 | 5/1993 | Eastman et al. | 235/462 |
| 5,235,167 | 8/1993 | Dvorkis et al. | 235/467 X |
| 5,241,164 | 8/1993 | Pavlidis et al. | 235/462 |
| 5,243,655 | 9/1993 | Wang | 235/462 |
| 5,247,166 | 9/1993 | Gannon et al. | 250/208.1 |
| 5,291,564 | 3/1994 | Shah et al. | 382/46 |
| 5,420,409 | 5/1995 | Longacre, Jr. et al. | 235/462 |
| 5,463,214 | 10/1995 | Longacre, Jr. et al. | 235/462 X |

FOREIGN PATENT DOCUMENTS

| | | | |
|---|---|---|---|
| 0385478A3 | 1/1990 | European Pat. Off. | 235/462 |
| 0385478 | 9/1990 | European Pat. Off. | 235/462 |
| 0571892 | 1/1993 | European Pat. Off. | 235/462 |
| 0561334 | 9/1993 | European Pat. Off. | 235/462 |
| 0584559 | 2/1994 | European Pat. Off. | 235/462 |
| WO9318478 | 6/1993 | WIPO | 235/462 |

OTHER PUBLICATIONS

ScanTeam Advertisement—Welch Allyn Jul. 1994.
Symbol Express Product Catalog Jan. 1995.

*Primary Examiner*—Donald T. Hajec
*Assistant Examiner*—Thien Minh Le
*Attorney, Agent, or Firm*—Wall Marjama & Bilinski

[57] ABSTRACT

A portable, hand-held, self-contained two-dimensional bar code reader adapted to the PDF417 symbology, includes a light source, a photodetector, and a decoder. The decoder comprises an 8 bit microcomputer, having an address space of 64K bytes, but actually using an 8K Byte SRAM for data storage, and 32K Byte PEROM for program instructions. Performance is enhanced by a novel program resident in the program memory, and by the use of direct memory access to load signals derived from the photodetector into memory. The unit draws an average of 1.4 watts during a reading operation when the light source is enabled and 0.83 watts during decoding when the light source is disabled. It is capable of reading an 800 character PDF417 symbol at an error correction level of 5 in about 2 seconds.

12 Claims, 5 Drawing Sheets

400
EC LEVEL 2
200 CHARACTERS

410
AAAAAAAAAAAAAAAAAAAAAAAAAAAAAAAAAAAAAAAAAAAAAAAAAAAAAAAA
AAAAAAAAAAAAAAAAAAAAAAAAAAAAAAAAAAAAAAAAAAAAAAAAAAAAAAAA
AAAAAAAAAAAAAAAAAAAAAAAAAAAAAAAAAAAAAAAAAAAAAAAAAAAAAAAA
AAAAAAAAAAAAAAAAAAAAAAAAAZ

500
EC LEVEL 4
400 CHARACTERS

510
AAAAAAAAAAAAAAAAAAAAAAAAAAAAAAAAAAAAAAAAAAAAAAAAAAAAAAAA
AAAAAAAAAAAAAAAAAAAAAAAAAAAAAAAAAAAAAAAAAAAAAAAAAAAAAAAA
AAAAAAAAAAAAAAAAAAAAAAAAAAAAAAAAAAAAAAAAAAAAAAAAAAAAAAAA
AAAAAAAAAAAAAAAAAAAAAAAAAAAAAAAAAAAAAAAAAAAAAAAAAAAAAAAA
AAAAAAAAAAAAAAAAAAAAAAAAAAAAAAAAAAAAAAAAAAAAAAAAAAAAAAAA
AAAAAAAAAAAAAAAAAAAAAAAAAAAAAAAAAAAAAAAAAAAAAAAAAAAAAAAA
AAAAAAAAAAAAAAAAAAAAAAAAAAAAAAAAAAAAAAAAAAAAAZ

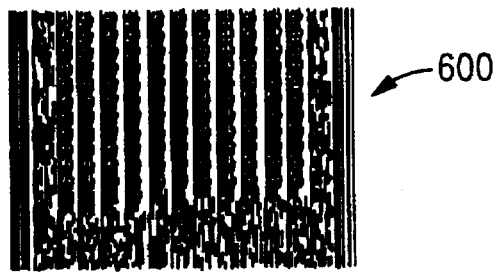

EC LEVEL 6

800 CHARACTERS

← 610

AAAAAAAAAAAAAAAAAAAAAAAAAAAAAAAAAAAAAAAAAAAAAAAAAAAAAAAAAAAAAAAA
AAAAAAAAAAAAAAAAAAAAAAAAAAAAAAAAAAAAAAAAAAAAAAAAAAAAAAAAAAAAAAAA
AAAAAAAAAAAAAAAAAAAAAAAAAAAAAAAAAAAAAAAAAAAAAAAAAAAAAAAAAAAAAAAA
AAAAAAAAAAAAAAAAAAAAAAAAAAAAAAAAAAAAAAAAAAAAAAAAAAAAAAAAAAAAAAAA
AAAAAAAAAAAAAAAAAAAAAAAAAAAAAAAAAAAAAAAAAAAAAAAAAAAAAAAAAAAAAAAA
AAAAAAAAAAAAAAAAAAAAAAAAAAAAAAAAAAAAAAAAAAAAAAAAAAAAAAAAAAAAAAAA
AAAAAAAAAAAAAAAAAAAAAAAAAAAAAAAAAAAAAAAAAAAAAAAAAAAAAAAAAAAAAAAA
AAAAAAAAAAAAAAAAAAAAAAAAAAAAAAAAAAAAAAAAAAAAAAAAAAAAAAAAAAAAAAAA
AAAAAAAAAAAAAAAAAAAAAAAAAAAAAAAAAAAAAAAAAAAAAAAAAAAAAAAAAAAAAAAA
AAAAAAAAAAAAAAAAAAAAAAAAAAAAAAAAAAAAAAAAAAAAAAAAAAAAAAAAAAAAAAAA
AAAAAAAAAAAAAAAAAAAAAAAAAAAAAAAAAAAAAAAAAAAAAAAAAAAAAAAAAAAAAAAA
AAAAAAAAAAAAAAAAAAAAAAAAAAAAAAAAAAAAAAAAAAAAAAAAAAAAAAAAAAAAAAAA
AAAAAAAAAAAAAAAAAAAAAAAAAAAAAAAAAAAAAAAAAAAAAAAAAAAAAAAAAAAAAAAA
AAAAAAAAAAAAAAAAAAAAAAAAAAAAAAZ

FIG.6

BAR CODE READER

CROSS REFERENCES TO RELATED APPLICATIONS

This is a continuation of U.S. patent application Ser. No. 08/371,037, filed Jan. 10, 1995, now abandoned.

BACKGROUND OF THE INVENTION

1. Field of the Invention

This invention relates to two-dimensional bar code readers. More particularly this invention relates to a self-contained bar code reader that is fully capable of reading and decoding both one-dimensional bar codes and two-dimensional bar code symbologies such as PDF417.

2. Description of the Prior Art

Self contained bar code readers are now well known in the art. A modern example is the ST3000 model produced by the assignee hereof. Such readers often have microcomputers that are capable of scanning or reading linear bar code symbologies such as the UPC codes or code 39 that are widely used in supermarkets and similar retail establishments. These codes are herein termed "linear bar codes". As used herein, the term "scanning" means detecting the presence of a bar code symbol and acquiring an electrical representation of the optical pattern of the symbol. The term "reading" means scanning the symbol, and then decoding the electrical representation to yield information in a standardized format. ASCII is an example of a standardized format that could be output by a decoder. "Self-contained", as used herein does not exclude an external power supply for the bar code reader, nor a communication line to an external host.

More recently it has been proposed to increase the information content of machine readable graphic images such as bar code symbols by encoding the data into a two-dimensional bar code symbol in which the data are arranged in rows and columns. These codes are sometimes arranged as fixed-width patterns in a matrix.

Code One is a two-dimensional matrix symbology that can encode the full ASCII 256 character set in addition to four function characters and a pad character. This symbology has ten different versions defined, with 27–50% of the symbol characters allocated to error detection and correction. Some versions use Reed-Solomon error control.

Another two-dimensional bar code symbology is PDF417. PDF417 is explained in Wang, U.S. Pat. No. 5,243,655, which is incorporated herein by reference.

Briefly summarized, PDF417 is a two dimensional (17,4) symbology, a specialization of the (n,k) family of bar codes. In PDF417 a code word comprises 17 bits comprising 4 runs of bars and 4 runs of spaces in differing combinations, which produces a large number of legal patterns. Each space and each bar can vary in width from 1 to 6 arbitrary units, so long as the total number of units in the code word is 17. Three mutually exclusive subsets or clusters of the set of legal patterns are used in PDF417, each cluster containing 929 code words. Each of the 929 code words can be ordered in a t-sequence, and the patterns in the t-sequences can be mapped to a desired alphabet by suitable translation tables.

Each row of a PDF symbol comprises code words selected from one of the three clusters, and there is a periodic rowwise usage of the three subsets. It is possible to identify the particular cluster to which a code word belongs by computing a discriminator function:

$$f(X)=(x_1-x_3+x_5-x_7) \bmod 9$$

where X is the mark pattern of the code word; $x_1$, $x_3$, $x_5$, and $x_7$ represent the width of bars in the pattern; and $x_2$, $x_4$, $x_6$, and $x_8$ represent the widths of spaces. While 9 clusters are possible, only three are actually used in PDF417, clusters 0, 3, and 6.

In each row of a PDF symbol there is a start pattern, a left row indicator code word, data code words, a right row indicator code word, and a stop pattern. Error correction information may be included in the data code words. The row indicator code words contain information about the organization of the symbol, specifically the row number, the number of rows in the symbol, number of data columns and the security level. Not all of this information is contained in every row indicator code word; instead the information is distributed in a pattern which repeats every three rows.

During a scanning operation the scanner can identify the cluster of a particular code word, and hence its row identifier modulo 3. This local row identification is particularly useful when the scanning axis is not perfectly aligned with the rows of the symbol, and a transition between two rows occurs during a scanning operation. Detection of row crossing permits "scan stitching"—a mapping of partial row scans into a matrix or memory. Missing pieces in the partially completed matrix can be filled in by other scanned data, possibly from entirely different rows, either because the data is redundantly expressed in the symbol, or with the use of error correction algorithms such as Reed-Solomon codes. A typical scan stitching method is disclosed in Pavlidis et al., U.S. Pat. No. 5,241,164.

In some prior art devices, relative motion between the scanner and the two-dimensional symbol is necessary to collect data from most of the entire area of the symbol and thereby effect a reading.

Reading a PDF417 code can be conducted in a known manner on a character-by-character basis in accordance with a two step process. In the first step a code word is scanned and its discriminator function computed. The first step is completed by identifying the cluster of a code word and determining the value of the t-sequence for the identified cluster. In a second step, or high level decoding, error detection and correction is carried out, and then the member of the alphabet that was encoded in the symbol is derived from the value of the t-sequence, using look-up tables or similar.

It is a present problem in the art that the computational resources required to read a PDF417 bar code symbol in an acceptable time are rather large, requiring extensive memory and processing power. The relatively sophisticated computers generally used for PDF417 decoding have at least 16-bit processors, largely due to the computational effort involved in error detection and correction on a large number of characters (up to 928 characters per symbol), and the fact that the character set is larger than a convenient eight bit representation. A further difficulty concerns the large size of the encoded message (up to 2710 digits) and the limited amounts of computer random access memory available to handle this information. 16-bit processors are presently much more expensive than the 8-bit microprocessors currently found in commercial portable bar code readers, such as the above mentioned ST3000. Furthermore the 16 bit processors require large amounts of memory to decode PDF417 symbols, and they consume too much power to be practical in inexpensive portable bar code readers. As a result it has been necessary to offload undecoded data from a bar code scanner to a remote decoder, such as a desk-top computer, RISC, or a digital signal processor to accomplish the decoding. This necessitates further communication links between the decoder and the bar code scanner for purposes of error detection and correction. As a result, the installation of a portable two-dimensional bar code reader in conjunction with a cash register or point-of-sale terminal is rendered complex and expensive. Many retail installations tolerate neither the additional space required by the remote decoder nor the costs associated with the additional hardware.

SUMMARY OF THE INVENTION

It is therefore a primary object of the present invention to provide a self contained bar code reader that is capable of rapidly reading two-dimensional bar code symbols such as PDF417.

It is another object of the invention to provide a fully self-contained portable, hand-held bar code reader that contains electronic and computational structural features adapted to the scanning and decoding of two-dimensional bar code symbols.

It is yet another object of the invention to efficiently accomplish the scanning and decoding of two-dimensional bar code symbols utilizing a small, inexpensive microprocessor with minimal memory and power consumption.

These and other objects of the present invention are attained by a portable, hand-held, self-contained two-dimensional bar code reader adapted to the PDF417 symbology, including a light source, a photo-detector, and a decoder. The decoder comprises an 8 bit microcomputer, having an address space of 64K bytes, but actually using an 8K Byte SRAM for data storage, and 32K Byte programmable erasable read only memory (PEROM) for program instructions. Performance is enhanced by a novel program resident in the PEROM, and by the use of a direct memory access to load signals derived from the photodetector into memory. The unit's housing is approximately 7½×3½×2 inches. It weighs 7½ oz., and during a reading operation, its power draw is 1.4 watts average during scanning, and 0.83 watts during decoding with the illumination off.

In one aspect of the invention the light source illuminates a narrow strip on the bar code symbol, and the photodetector's field of view corresponds to the strip.

In another aspect of the invention the photodetector is a CCD matrix that acquires an image of the entire bar code symbol.

In yet another aspect of the invention, the photodetector is a photodiode, and the light source is a rasterizing laser that scans the symbol in a row wise fashion.

BRIEF DESCRIPTION OF THE DRAWING

For a better understanding of these and other objects of the present invention, reference is made to the detailed description of the invention which is to be read in conjunction with the following drawings, wherein:

FIGS. 4–6 are standard PDF417 bar code symbols having various amounts of information and different levels of error correction encoded therein;

DESCRIPTION OF THE PREFERRED EMBODIMENTS

First Embodiment

Figure 1:
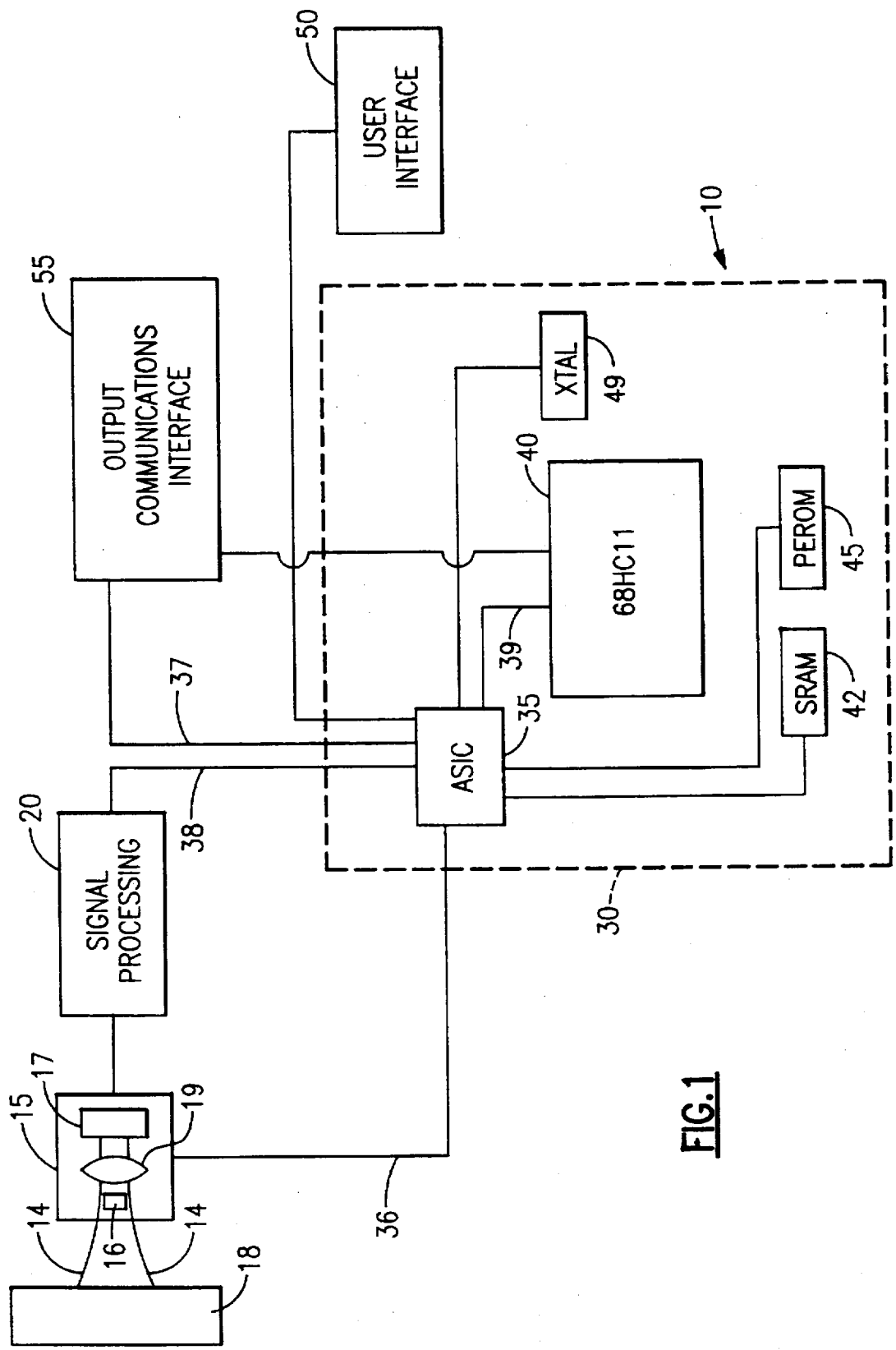
FIG. 1 is a block diagram of a bar code reader suitable for practicing the invention.

Turning now to the Drawing, and initially to FIG. 1, a bar code reader 10 is shown. Suitable hardware comprising the reader is commercially available as model ST3000-22 from Welch Allyn, Skaneateles Falls, N.Y., and the invention can be practiced therewith provided that certain modifications disclosed herein are made. The bar code reader 10 is a portable self-contained hand-held unit that is capable of scanning and decoding bar code symbologies. The unit could be as large as 10×4×3 inches and weigh as much as 10 oz., but It preferably has dimensions of about 7½×3½×2 inches, and draws 1.4 watts average during scanning, and 0.83 watts during decoding with the illumination off. It preferably weighs 7.5 oz. The unit can resolve bar code elements that are 5 mils in width.

The bar code reader 10 has conventional optics 15 and a plurality of 660 nm light emitting diodes 16 that illuminate a narrow strip of a bar code symbol 18, which corresponds to the region of sensitivity of the unit's photodetector. A lens system of the optics 15 is described in U.S. Pat. No. 5,291,008, which is assigned to the assignee of the present invention, and incorporated herein by reference. Light returning from the bar code symbol along a receive path 14 through suitable focusing lenses 19 strikes a photodetector which is realized as a charge coupled device (CCD) array 17. The CCD array 17 develops analog signals that are representative of an optical pattern of a complete scan line across the bar code symbol. The analog signals are passed through signal processing electronics 20 which provide signal conditioning and analog-to-digital conversion, and digitization. Digitization is accomplished using an analog reconstruction circuit which is disclosed in U.S. Pat. No. 5,294,783, of common assignee herewith, and also incorporated herein by reference. The resulting signal, a binary representation of the bar code symbol being read, is submitted to a microcomputer 30.

Figure 2:
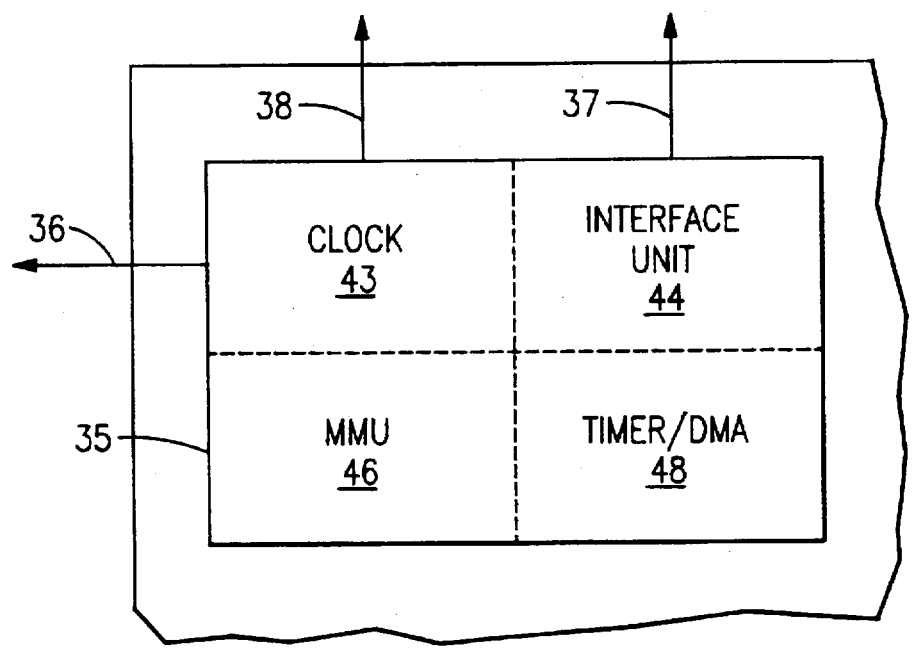
FIG. 2 is an enlarged view of a portion of FIG. 1.

The microcomputer 30 performs various tasks necessary to the operation of the system. It includes a microcontroller 40, realized as a Motorola MC68HC11D0CFN3, and has an address space of 64K bytes. The MC68HC11D0CFN3 is also provided with serial and parallel I/O, interrupt logic, an oscillator, and clock logic. As employed in the microcomputer 10, the microcontroller 40 is provided access to an 8K Byte static RAM 42 and a 32K Byte PEROM 45. The capabilities of the microprocessor 40 are enhanced by a multifunctional ASIC 35. As shown in FIG. 2 the ASIC 35 has four principal functional blocks. A CCD clock control 43 facilitates switching the scan rate of the CCD array between 50, 100, and 200 scans/second and provides further control of the CCD array (indicated by line 36) as may be desired for optimized scanning operation. A memory management unit 46 (MMU) provides limited memory management capability. The timer/DMA channel 48, coupled to the signal processing electronics 20 (indicated by line 38), automates the input signal capture for subsequent decoding. This allows dedication of the microcontroller 40 to pattern analysis for decoding of the bar code symbol. Finally a general interface unit 44 permits a flexible communications interface for the bar code reader 10, indicated by line 37. The entire ASIC 35 is controlled by the microcontroller 40 through an internal bus 39.

The internal clock logic of the microcontroller 40 is controlled via the ASIC 35 by an oscillator having a crystal 49. To increase the performance of the system, and to handle the high computational load imposed by the decoding of PDF417 symbols, a crystal having a frequency of 14.7456 MHz, has been substituted for the 7.3728 MHz crystal which is furnished in the unmodified ST3000-22 model. Other modifications to the basic ST3000-22 model are as follows:

SRAM 42 is a 70 ns 8K×8 CMOS RAM (SONY part number CXK5864BM-70L).

Microprocessor 40 is a Motorola MC68HC11D0CFN3.

PEROM 45 is a 90 ns model (ATMEL AT29C256-9).

Regarding the above mentioned part substitutions, the doubling of the crystal frequency is the most important contributor to performance, while the substituted SRAM, microprocessor, and PEROM insure component reliability at the increased clock frequency.

Firmware resident in the PEROM 45 contains the executable instructions for the microcontroller 40. Portions of the program realized in the PEROM 45 are conventional, and allow the bar code reader 10 to function as a conventional autodiscriminating reader for linear bar code symbologies, as well as to decode PDF417 symbols.

Figure 3:
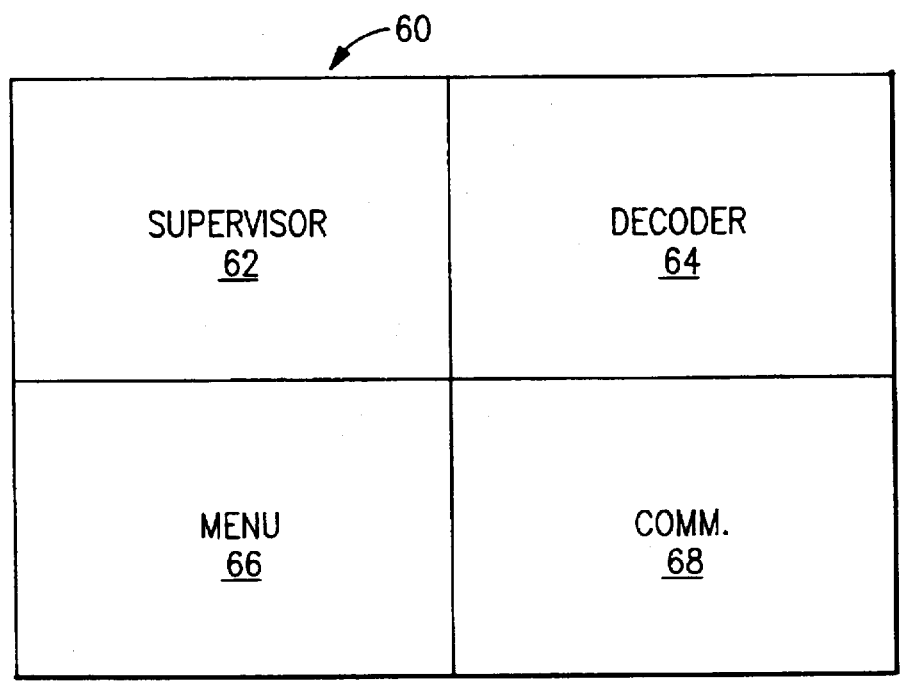
FIG. 3 is a block diagram illustrating the organization of a program for a computer in the bar code reader shown in FIG. 1.

Broadly, the firmware 60 consists of 4 main blocks, as shown in FIG. 3. A variety of system supervisory functions, indicated by reference numeral 62 include the initialization of volatile hardware and memory regions, controlling and sequencing the scanning and decoding operations, and monitoring and maintaining I/O between the bar code reader, the operator, and external equipment.

Decoding functions, indicated by reference numeral 64, are accomplished in several stages. First a preliminary evaluation for the presence of a bar code symbol of interest is made. When such a bar code symbol is detected a detailed character-by-character decoding operation is performed in areas of interest. Error checking of the decoded character string is then accomplished, and finally the decoded characters are interpreted to determine their corresponding data message. In the case of linear symbologies, the decoding result from a scan is a message ready for transmission. In two-dimensional symbologies, such as PDF417, a decoding result is partial information which is stored in the static random access memory (SRAM) array 42 (FIG. 1), and later combined with the results of subsequent decoding operations, until the full data message is eventually compiled for transmission.

The menu functions, indicated by reference numeral 66, are routines called in response to decoding special bar code symbols, so-called bar code "menus" that set non-volatile bits or values within a designated configuration region of the PEROM 45, thus governing various operating characteristics of the bar code reader 10, such as scan rate, beeper volume, mode of operation (manual or auto-trigger), enablement of decoding of particular bar code symbologies, etc.

Communications functions 68 service the hardware and include protocols needed to deliver scanned data to an attached device. The bar code reader 10 can support a number of communications protocols and interfaces, including laser output, OCIA, OCR, RS-232, various commercial terminals and keyboard wedges, of which only the RS-232 interface is currently programmed.

What makes it possible for a device such as bar code reader 10 to effectively decode PDF417 bar code symbols is an extensive modification of the decoding firmware 60 resident in the PEROM 45. The object code of the firmware is exhaustively disclosed in Listing No. 1. Listing 1 is given in a well known Intel Hex format:

:NNAAAATTPPPPPPPPPPPPPPPPPPPPPPCC wherein

NN is the number of program bytes on the line;

AAAA is the address of the first program byte;

TT is the type of data;

PP are the program bytes; and

CC is the checksum for the entire line.

The installation of Listing No. 1 into the PEROM 45 is accomplished with the use of a loading program, which is shown in Listing No. 2. Listing No. 2 is executed in accordance with well known techniques specified by Motorola. The ST3000-22 is first connected to COM1 of an IBM PC (trademark) or compatible personal computer running DOS, having Listing No. 2 loaded into the BASIC interpreter, and having Listing No. 1 available in a file. The ST3000-22 is powered up in bootstrap mode. Then, with the trigger of the ST3000-22 depressed, Listing No. 2 is executed in the personal computer. Pressing any key of the personal computer will initiate the installation of a download program into the internal RAM (not shown) of the MC68HC11D0CFN3. The user then responds to a prompt by entering the name of the file containing Listing No. 1. Listing No. 1 is then downloaded directly into the PEROM 45.

The firmware 60 in accordance with the invention operates on PDF417 symbols using a two-step process. The First step executed by the microcomputer 30 in accordance with the instructions in Listing No. 1 is row decoding. This step is similar to linear bar code reading, and comprises the location of sequences of PDF417 symbol characters adjoining a start or stop character. What makes PDF417 scanning more computationally intensive than scanning linear bar codes, for example code 39 and UPC, is the allowance for "scan stitching", wherein decoding must be able to follow scans that move between different rows. Furthermore the large 17-module characters within the large PDF417 character set preclude normal look-up procedures because the PEROM 45 is limited in size. In scan stitching the difficulty presented is that whenever a scan path slides from one row to the next, one or more invalid character patterns may be seen. Such patterns may not even have a proper number of elements. Yet it is still necessary to pick up the decoding process with subsequent valid characters once the transition between rows is made. The decoding process takes advantage of the fact that all characters start with a space-to-bar transition that is aligned across rows, so that even as a scan transitions between rows, there is a recognizable start to each character position.

The second step is message or array decoding, wherein the decoded PDF417 characters are placed into appropriate positions of a row and column matrix that is representative of the symbol. Then the rows, considered as one concatenated string, are error checked, error corrected, and finally interpreted into the encoded message. All of this is accomplished within the limitations of the 8K SRAM 42. The decoded information is output through a conventional communication interface 55. User interfaces 50 provide audio-visual indicators to the operator of the progress of the scan, and the results thereof. Such an interface is disclosed in copending application Ser. No. 08/137,640, of common assignee herewith.

The bar code reader 10 is autodiscriminating and capable of reading several well known linear bar code symbologies, including, for example, UPC.

The device is used by placing the reader 10 in contact or near contact with the symbol 18, which can be a PDF417 symbol. The reader is preferably approximately aligned with the rows of the symbol. Reading is then initiated by depressing a manual trigger, or in the alternative, the reader 10 can sense the presence of the bar code symbol 18 and self-actuate. The operator is informed of a valid read by an audible annunciator.

EXAMPLE 1

Figure 4:
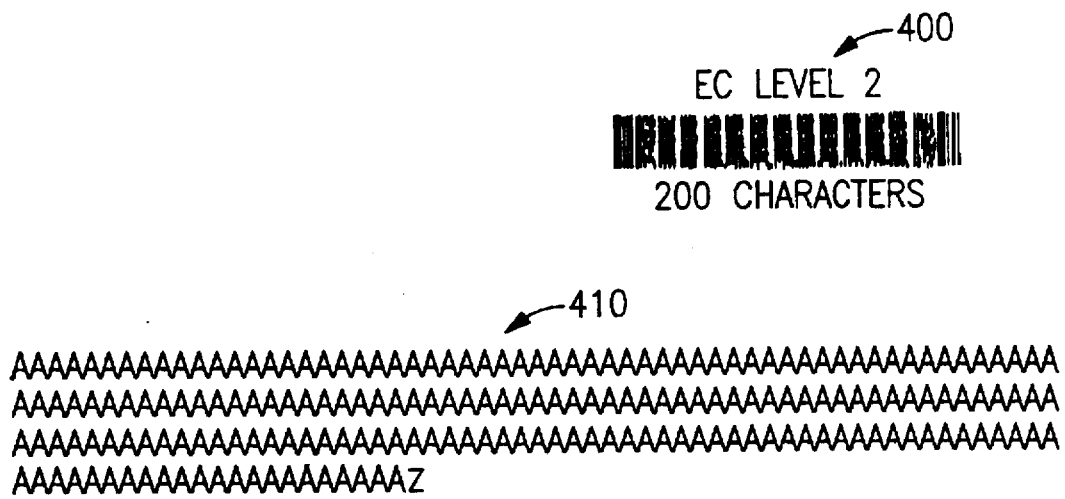
Figure 5:
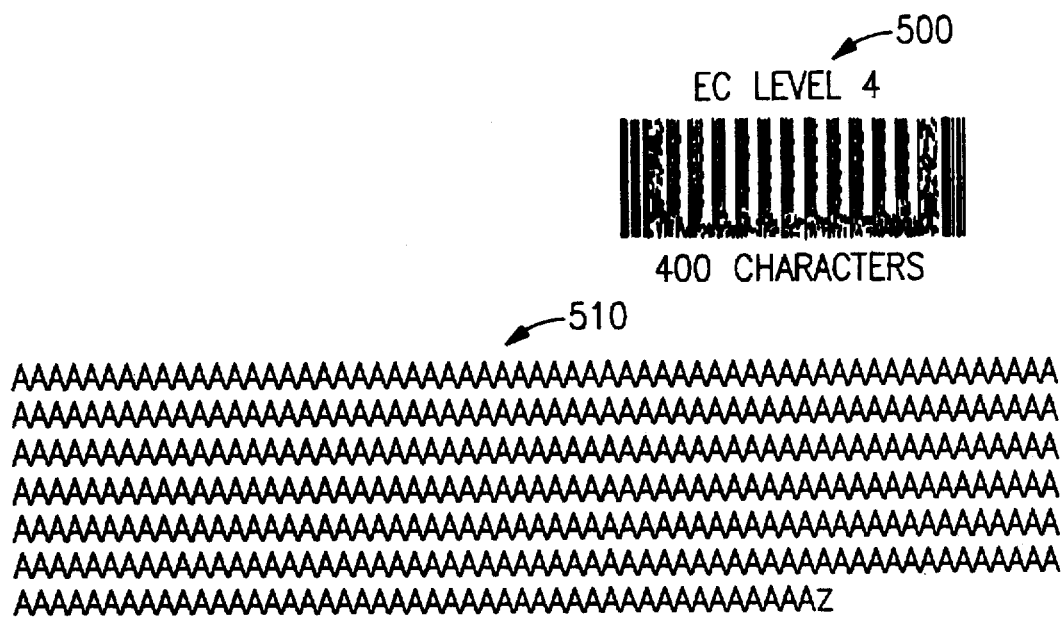

Using the embodiment described above, standard PDF symbols (shown representatively at reference numerals 400, 500, 600 in FIGS. 4-6) were read repeatedly for 30 seconds. As previously explained, a "read" is a full operation, including scanning of the bar code information, decoding, and output of the decoded information. In this example the read head of the hand-held bar code reader was maintained in contact with the data carrier and in alignment with the row axes of the bar code symbol. There was no tilt with respect to the plane of the data carrier. Ambient room lighting conditions were present. The decoded information is shown as character sequences 410, 510, 610. The results are shown in table 1.

TABLE 1

Number of reads in 30 Seconds - According to Invention

| Text Chars | Error Correction Level | | | | | | | | |
|---|---|---|---|---|---|---|---|---|---|
| | 0 | 1 | 2 | 3 | 4 | 5 | 6 | 7 | 8 |
| 100 | 54 | 61 | 69 | 75 | 76 | 75 | 50 | 27 | 15 |
| 200 | 31 | 43 | 48 | 59 | 57 | 53 | 39 | 24 | 14 |
| 400 | 22 | 28 | 24 | 25 | 28 | 25 | 23 | 18 | 13 |
| 800 | 11 | 14 | 13 | 16 | 15 | 16 | 13 | 12 | 8 |
| 1200 | 8 | 9 | 9 | 10 | 10 | 9 | 7 | — | — |
| 1600 | 5 | 6 | 6 | 7 | 7 | 7 | — | — | — |

By way of comparison, this experiment was repeated using a currently available state-of-the-art two dimensional hand-held bar code reader connected to a remote decoder. This state-of-the-art system utilized a more powerful microprocessor than the 68HC11. The results are shown in table 2.

TABLE 2

Number of reads in 30 Seconds - Conventional Bar Code Reader

| Text Chars | Error Correction Level | | | | | | | | |
|---|---|---|---|---|---|---|---|---|---|
| | 0 | 1 | 2 | 3 | 4 | 5 | 6 | 7 | 8 |
| 100 | 58 | 65 | 73 | 77 | 80 | 77 | 71 | 41 | 15 |
| 200 | 45 | 50 | 58 | 58 | 60 | 60 | 59 | 35 | 12 |
| 400 | 32 | 35 | 37 | 39 | 47 | 45 | 43 | 29 | 13 |
| 800 | 16 | 22 | 24 | 26 | 26 | 26 | 24 | 18 | 10 |
| 1200 | 12 | 13 | 15 | 16 | 17 | 17 | 17 | 13 | — |
| 1600 | 9 | 0 | 11 | 12 | 13 | 13 | — | — | — |

The results in accordance with the present invention are only slightly less impressive than the conventional bar code reader in performance, but are accomplished with apparatus that is clearly simpler, smaller, and cheaper than the conventional device.

Second Embodiment

Figure 7:
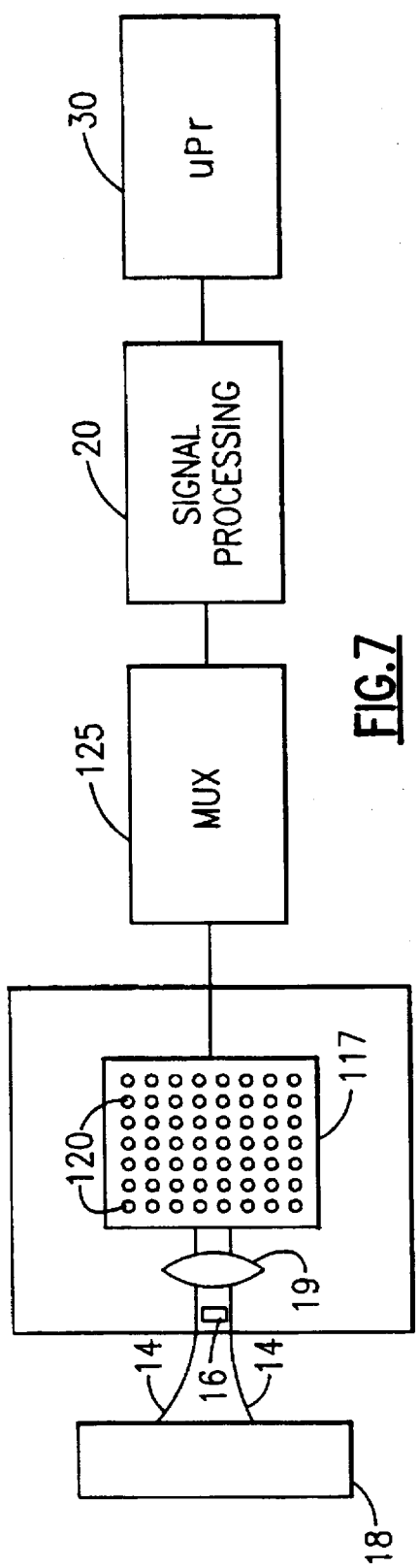
FIG. 7 is a schematic of a second embodiment of the invention.

Turning now to FIG. 7, there is shown a schematic of a portion of a second embodiment of the invention, wherein similar parts have the same reference numbers as in FIGS. 1 and 2. This embodiment has the same general construction as the first embodiment, except now the photodetector is realized as a two dimensional CCD matrix 117 comprised of elements such as 120—120, instead of a linear CCD array. During a scanning operation the CCD array simultaneously acquires an image of the entire two dimensional bar code symbol 18. The signals developed by the CCD matrix 117 are multiplexed in row-wise fashion through MUX 125, and then coupled to the signal processing circuitry 20. With the use of the multiplexer, the two dimensional array 117 in a single scanning operation thus emulates multiple scans executed by the linear array 17 of the first embodiment, and the signal format is entirely acceptable to the signal processing circuitry 20, and the microprocessor 30, both of which see the same signals as would be produced by a linear CCD array.

Third Embodiment

Figure 8:
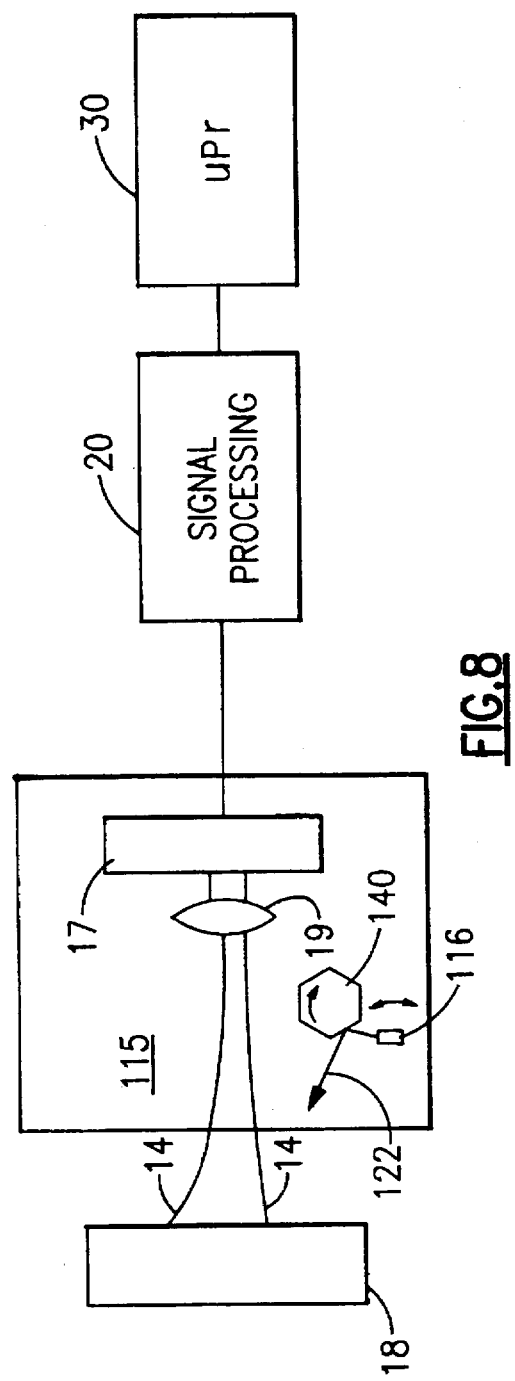
FIG. 8 is a schematic illustrating a third embodiment of the invention.

A third embodiment of the invention is explained with reference to FIG. 8. This embodiment has the same general construction as the first embodiment, except that the light source 116 is a rasterizing laser, realized as a laser light source 116, and a beam deflector 140, which can be a rotating or vibrating mirror, or a bimorph. Rasterizing lasers are well known in the art. A laser beam deflecting apparatus is disclosed, for example, in Swartz et al., U.S. Pat. No. 4,251,798. The rasterizing laser is operated in conjunction with one or more photodiodes 217, so that the bar code symbol is illuminated and scanned in row wise fashion, as the beam deflector causes the laser beam 122 to oscillate in a horizontal direction, and in a vertical direction, as indicated by the arrows in box 115. According to the above noted U.S. Pat. No. 5,241,164, misalignment of the scanning line can be tolerated when scan stitching is employed.

While this invention has been explained with reference to the structure disclosed herein, it is not confined to the details set forth and this application is intended to cover any modifications and changes as may come within the scope of the following claims:

Listing 1

```
:10FFB0008EED8040000000008000803F00000000C7
:10FFC000000000000000000000000000000000031
:10FFD00000000000000000086AC807680768076807617
:10FFE00088A488998076807685198076807680767658
:10FFF0008825807680768076807680768076807680769A
:108000000FFFFFFFFFFFFFFFFFFFFFFFFFFFFFFFFFFFF80
:10801000FFFFFFFFFFFFFFFFFFFFFFFFFFFFFFFFFFFFFF70
:10802000FFFFFFFFFFFFFFFFFFFFFFFFFFFFFFFFFFFFFF60
:10803000FFFFFFFFFFFFFFFFFFFFFFFFFFFFFFFFFFFFFF50
:108040000D5741333432313930313230D3131393419
:10805000CE24FFFFFFFFFFFFFFFF0D0AFFFFFFFF23
:10806000FFFF8A8A97FEE0E32D0D000A0A10662FB3
:1080700000050D00CAFE8E01FFCC203B973DD7398D
:10808000CC01439726D724CC0000973F97F1DDEB36
:10809000B7020097F497ED97F097EE97F9CC034F5E
:1080A0009746D748CE800018CE001BBD89B31AA3CF
:1080B000002709CE00000926FDBD8974BD8952CE76
:1080C000FFF134302090926F914ED8014D004BDF3
:1080D000846FDC0EC30064DD180E13D080181246C6
:1080E000200E12D0040ACE00FF134302090926F91C
:1080F000BD8426BD8419201313F9800B13EA0804EC
:1081000012D004037E833C13EA0103BDC9BCBD90B9
:108110002615228013EA800B12D0040713F90103FD
:10812000BD855EBD903013ED400315ED50CC55AAD2
:10813000973AD73A12D0042D12ED102C13ED02ED20
:10814000124620E996F126E5132E40E1FE0211BC0D
:1081500020F26D9DCEB26D586049746CC55AA9784
:108160003AD73A20F714470415ED107F008014F930
:108170001BD901012228012CC00020FD30EDD162A
:10818000E14228014FC8014FE807F0200DC8E1A04
:108190009390266012EA041096F0270C4A97F02676
:1081A0000713F980037E833CBD850413D00445DCAE
:1081B00090938E840F1A83001B24291A83000B24AA
:1081C0003312ED022F7C00ED13ED022815ED18138C
:1081D000ED200E15ED20CCCFFFD30EDD1886409795
:1081E000237E80F815ED0112ED080914ED181547EE
:1081F000415ED02CE00E24FBD904E263F5D2735BF
:108200002B0D13D0202CDCEB2628BD842620231335
:10821000F1FF03BD89525313EA080E13002008B67C
:10822000002342B03BD857AC6C8D7F013D01003BD26
:10823000842F7E818A1380FF607E80F881802602F1
:10824000C840FD0201817226037E83364D2A0A81D1
:1082500085240681822442016847F816C276481D4
:108260006F276081672708128D0404C10A2454B661
:1082700002002639FC0201FD02038D20FD0205CC1F
:108280000267F102012707F60202C10524028609EE
:10829000138D04028613B702007E818DCC0000CEC0
:1082A00001001E00FF06EB001B0820F639FC02014E
:1082B000B3020326BF8DE5B3020526B87A02002675
:1082C000D820058DD7FD020513D0042214ED20FC23
:1082D00002011AB30207261CFC02051AB302092682
```

-22-

```
:1082E0001313ED10B41223400B15ED1020ABBD900D
:1082F00026152280FC0205FD0209FC0201FD020791
:108300002A0D81822409BD88E515F9017E810B7D46
:1083100000F12705BD8952200713D04003BD841901
:10832000B6020181702606BDC9BBF70202CE01006C
:108330004FF60202205114F9807E818A15F980BD22
:10834000902615228013D00803BD8445BDE778240C
:108350000A13D00803BD84577E817113D00803BD72
:10836000845713D04003BD841913EA02058617BD54
:108370008662BDE7B6FD020113EA0803BD862CCE76
:108380000C00DC90830C00188F8D32188C000027B5
:1083900024CC55AA973AD73AA6002A11F60201C171
:1083A00072270A818026068D1E8D122003BD8662EB
:1083B00008180926DC8D1015F9017E810B3CCE00D2
:1083C0000D2C600D7F520043CCE00DAC608A6002AA3
:1083D0003D818026069681847F20338181260E860A
:1083E0005DBD86629682BD86629683202181852648
:1083F0000796F5BD88C720198186260496F5200EBC
:108400008187260D085A270DA60097F52003BD8603
:1084100062085A26B838398D0086200F9BEB97EBFF
:108420000E398D028D0086100F9BEC97EC0E39DC17
:10843000EB2611CC0258D30EDD1ECC08039723D7B0
:108440006814220839DCEB26FC122208F8B6807585
:108450008D0CC603D76839C600D768B68074D6D0ED
:10846000C4035C5858B1807527015810DD4439CCDD
:1084700000FA9708D709C620D700CE4000FF020BAC
:10848000FF020DCE4020FF020FFF0211862C972D18
:10849000CCE428DD42CC054F9746D748CCFF40DDE1
:1084A0004986009747CC0000DD4CBD84EBA600C692
:1084B00096DD60869CE601DD62CC2270DD64CCFF37
:1084C0003EDD66C6E7D775C6FFDD698613976BCCC0
:1084D000FAFBDD6ECCFCFDDD6CDD7186359770CC72
:1084E000FEFEDD738610DD77977939CE84F4C60001
:1084F00058583A39E2840480A4D30DA3C4C20900B9
:10850000083E31200CC55AA973ADCFE2BFCDD68
:1085100090DCFCDD8E14FE8039DCFCDDFEDC40C529
:10852000127FADDFC8DC4EC02D316DD1686809798
:1085300023CC3E229767A601DD63CC70FFDD65CCBE
:1085400010FEDD77977C3B96D18407438417972BE9
:10855000CC0038D4D1C12825028610972C398678D2
:108560009781865897828630 9783BD83BD864EBD9E
:1085700086628652BD86627E83C74FF602325C37C2
:108580008FFC0234028FBD860E8678BD866233BDB5
:10859000860E863DBD8662FC0234B302388D5F864E
:1085A0002B8D77FC02388D56863D8D6EFC02348D06
:1085B0004D86208D65FC023C8D44FC023CF3023864
:1085C000830002B302342533DD9886208D4CFC02F3
:1085D00038830002DD9ACE0046DC98050505939AA3
:1085E0002515939A25110909939A250B09939A2524
:1085F0000609939A2501098F178D677E88AFCE00F3
:108600002F0883006424FACB648F178D558F862F33
:108610004CC00A24FB8D4B178B3A204620457261D3
:1086200073202BA02045727273203DBEFC023405DE
:10863000F31FFE83140004FD023CCC1400B31FFCA6
```

-23-

```
:10864000048DBBCE861C8D14FC1FFCB31FFE048D55
:10865000ADCE86248D067E85B18D0708A6002AF949
:10866000847F3C3716D8F5D7F512D12016847F13B6
:10867000D1100A1688805425FB26FB888013D10868
:10868000028880FE0211A7008D188655973A4397FD
:108690003ABC020F27F4FF02113338150020142DC5
:1086A0008039088C40802503CE402039122E204B83
:1086B000FE020FBC0211273C13D1C00E13D140069D
:1086C00012080433200412EE042D142C4012D13071
:1086D000022013A6005F13D108015C4425FC26FB91
:1086E000542503152C40A600972F8DB6FF020FBC12
:1086F0000211262914002152DC03B962FFE020DD5
:108700000A7008D1AFF020DBC020B2704132E0818B8
:10871000BD842213EE010614EE02FF020B3B088C0F
:1087200040202503CE40003912EE01F114EE010E77
:10873000FE020B2013CC55AA973AD73A12EE020D3F
:10874000FE020B8DD9FF020BBC020D260415EE03B1
:108750003BDCF6847F847FDDF7A60097F6D6F4260F
:1087600072814226037E87E8847F811826108680E6
:10877000D6F7BD88E515ED101480017E8735811987
:108780002604868120EA810D2605BD8CD520A613FE
:10879000D180198113260514EE0420998111260C2D
:1087A00015EE041200208E142D80208912ED081978
:1087B00012D004158112260514ED502013811426C1
:1087C0000815ED50148001200781072603BD841988
:1087D0007E8735C10122098142270D7F00F4208860
:1087E000C1032228814F26F37C00F42730860691AE
:1087F000F42608972F1522107E8735CCEA60D30E19
:10880000DD1C861097231422107E8735C1052204B3
:108810000815420D236860A8F32A70020CB0FBD0AA2
:10882000060E7E87358640972512D0043512ED401E
:108830000311343021615ED0412ED02267C00ED13F0
:10884000ED021F15ED18148080201715ED0112EDB3
:1088500081086049BED97ED13ED080615ED021444
:10886000ED1013EB1F1113EBFF1B7A00EB13EB184A
:1088700011C603D768200E13ECFFEB7A00EC12EC64
:10888000008EF5FD76813D1400F1200200B122D8024
:1088900000712080403142D803BCC10009723D7F453
:1088A0001522103BCC08009723D7681522083B36C9
:1088B000860DBD8662860ABD866232398F8D028F33
:1088C00039368D0C172001368D0686208D143239ED
:1088D00036444444448D0332840F8B308139230263
:0588E0008B077E86629B
:1088E50080812B03271739C041250FC107240B5859
:1088F500CA40D7F17F00F27E84177E842217D6F115
:1089050027F8812E272B812A2743812027665D2A78
:1089150016CA10803025E3810A25168007810A25AD
:10892500D98114250C8B37804B25CF810922CBC4E7
:10893500EFD7F1C40FCE89443AEE00D6F16E008927
:10894500BF8A258AC28B8A8B8F8B948B52CE8000EF
:1089550018CE00D0C61BBD8DECBD845BBD85477DA3
:1089650000F12601397F00F115ED120E7E8417CE38
:1089750080502003CE00D018CE0C00C61BBD8DEC58
:10898500CE0C0018CE001BBD89B3ED00CE801D189E
```

```
:10899500CE0C1DC623BD8DECBD8E43CE0C0018CE6E
:1089A50080000FCC55AA973AD73AAD4020ABCC0002
:1089B50000EB001B08180926F839812E261FB68002
:1089C500505D2B0BD6D0C40484FB1B97D0204BD60F
:1089D500F226048403202994F2273A2034C5102670
:1089E5001781062429CA80D7F11627078600465A1B
:1089F50026FC16D7F27E8419D6F2260D8104240EA4
:108A0500D6D0C4FC1B97D020114A2B0527077E849E
:108A150022DAD0200353D4D0D7D0BD845B7E84190D
:108A2500812E26395D2B078D13B68051206AD6F22B
:108A35005A2B1A271C5A27118D02206D96EA847F1E
:108A4500F6806AC4801B97EA39C63F2006C6F8201F
:108A550002C6C71743B48051D4D11B203BC510268D
:108A65000D81042455CA80D7F197F27E8419D6F278
:108A75005A2B39273F5A27114A2B042707203B1425
:108A8500EA80202515EA8020208103242DC63F4851
:108A95004848484848D4D11B97D1BD854715EE04B1
:108AA50096D185C02603142D807E84198107240A5A
:108AB500C6F820E1C6C7810825D87E8422812E26E6
:108AC50020CE805218CE00D25D2B07C610BD8DEC8E
:108AD5002078D6F22B07CE805A18CE00DAC60820A9
:108AE500ECC51026294A2B05270A7E84228688CEC6
:108AF50000D220058608CE00DA97F2C43FCA80D797
:108B0500F1840FC6FFE700084A26FA7E8419811012
:108B150024D8C540260F97F396F2850F27CCCA4077
:108B2500D7F17E8426C4BFD7F1165858585896F306
:108B350005050505C608D0F22A05CE00D22003CECC
:108B450000DAC40F3AA7007A00F27E8419812E2636
:108B55001496ED49595959FA8050C40496D084FBAE
:108B65001B97D0201AC51027037E84224A2B042781
:108B75000720F614D004200712ED80ED15D004155A
:108B8500ED127E8419CE8C812008CE8CA72003CED1
:108B95008CC6812E277CC51026214848484897F366
:108BA50081902707BD8C60290FD6F1C4BFCA80D735
:108BB500F196F397F27E84197E8422810225168030
:108BC5000A25F54CD6F2C4F01B97F3BD8C6029E855
:108BD50014F14020DC3696F28190270CBD8C603272
:108BE5005D27D54A8D1D2018324D260CCE806B1879
:108BF500CE00E2C609BD8DECD6F1C47FCA40D7F1DF
:108C05007E8419270518EA0020045318E40018E7A4
:108C1500003996F2819027E036C1C024088A0FC535
:108C2500402702867F97F396F23C8D2F382914183A
:108C35003C188F8300E2C38062188F1718A40018B0
:108C4500388DC0DCF24C97F21123DE3297F220B05A
:108C5500C1FF260D85F02722801008E600C1FF27F9
:108C65001918CE00E2C40F183A08E600C1F024E056
:108C750085F026F54D27044A20EF0B39F08040207A
:108C8500100804FFF1804020100804FFF280402006
:108C9500FFF206FFF201FFF60804FFF501FFF5807C
:108CA500FFFFF30080001008442201F40804FFF4DC
:108CB50000080402002010FFF410FFF680FFF620FF40
:108CC500FFF502F801020408FFF540FFF520FFFF5C
:108CD50096F88116263615EE80D6F7C52027051499
:108CE500EE80C4DFC1412524C1452420C143271D91
```

```
:108CF500BD8FDEC14126037E8D27C1422608BD8E6C
:108D05004EBD84192003BD8EDABD8FDE398606BDC2
:108D150086628615BD866286FEBD866286FFBD8635
:108D25006239CC55AA973AD73ADCEB26F50FB70A44
:108D350006CE8D4518CE0C40C6FEBD8DEC7E0C4092
:108D45008D6B883A26FAB70A05CE0A0A8D6D260379
:108D550014EE1016CB048D635A26FB4D26E218CE71
:108D65000A0EFC0A0BC4C0B30A062720183CCE0C19
:108D75000018FE0A062A028D4EFC0A0BC4C0FD0A25
:108D8500062A078F18CE0C008D5B18388D657A0A78
:108D95000A2ECF8606972F13EE10A5CC55AA973A23
:108DA500D73A122EC00220F3FEFFFE6E00865597BD
:108DB5003A43973A132E20F5962F398DF0A70008E0
:108DC500BB0A05B70A0539CCAA55B7D555F7AAAADE
:108DD500CCA0FFB7D555F7D5578D0A180918A100AE
:108DE50026FB180839C640A60018A7000818085A17
:108DF50026F539FC0A0BC50F26211A838050251349
:108E05001A83FFB0240D178A41B70A08869BB70A53
:108E15000920088600B70A08B70A09860CC43F8FDF
:108E250018E60017F00A09F80A08E7007D0A08277E
:108E350003B70A09FE0A0B08FF0A0B180839CE8D7D
:108E4500CCC62C18CE0C40209EBD8FA136BD8FA15F
:108E55001632FD0A0BBD8FA136BD8FA11632FD0A54
:108E650003CC0000FD0A068610B70A0AFC0A03B304
:108E75000A0B1A8300102C045CF70A0A7F0A059670
:108E85003ABD8662B60A0A2736BD8FBBFC0A0BBD02
:108E95008FBB17BD8FBB4FBD8FBBF60A0AFE0A0BF2
:108EA500BD8F41BD8FBB5A26F7FF0A0BB60A054099
:108EB500BD8662BD88AFBD8FA18106261020A8C6DC
:108EC50007CE8ED3A600BD8662085A26F739000064
:108ED50000001FF0D0ABD8FA136BD8FA11632188F77
:108EE500CDEE002702AD0039CE804018CE00001827
:108EF500FF0A0618FF0A0118FF0A03CC55AA973A7C
:108F0500D73A8CFFBC2603CEFFC08C00002718BDC6
:108F15008F4118FE0A0116183A18FF0A01188FF337
:108F25000A03FD0A0320D4FC0A01BD866217BD862B
:108F350062FC0A03BD866217BD866239373CC601ED
:108F4500F70A0D8F1A83805025461A83FFB02440F7
:108F5500C50F2622FD0A06CA41F70A08869BB70AED
:108F65000938F60A0DA600B80A08BB0A09B70A09A6
:108F7500085A26F13339B30A064D2606C5F02602EE
:108F85000020DFC40F5CF70A0D388FC4F0373620C4D4
:108F9500CC0000FD0A063833A60008393CFE020B5A
:108FA500BD871EFF020B8655973A43973ABC020DC3
:108FB50027F4A600383936BB0A05B70A05327E867E
:108FC500623630C8655973A43973AFE0211BC020F2A
:108FD50026F1132E40ED38323937BD8FC613EE40DA
:108FE5005B60A00200F96D1B70A0012EE80048656
:108FF500262002862497D1BD854796EE884097EEB8
:029005003339FD
:109010003686EC9742148D8037DC40C50127FADD97
:1090200090DD8E3332393686E49742158D803239A1
:10903000CCFF05CE0B00A7003A8C0B5025F8C608D4
:10904000CE0B80A7003A8C0BC025F83620CA9F961D
```

-26-

```
:10905000978CEC00DD84EC02DD86EC04DD88EC0608
:10906000DD8A128D80028DA8CCFFF9DD947F00810E
:10907000138C02061391023820041291023 2BD9221
:10908000AB26191381FF037E9127863C979CBD92E6
:10909000AB26097A009C26F6CC0000391389020A17
:1090A000158D067EC9EFDE92EC01A3039394247024
:1090B000BD92AB260220E17C008113890206158D4A
:1090C000067ECA9496818114260A13894014158D50
:1090D000067EAF178112260A13892006158D067E9B
:1090E000B1EF158D0696818111250D138790022011
:1090F000041388C0037EA8F7139480057C0095268E
:109100001CDE92EC01A31BDD940404D3940404DD63
:1091100094EC1BA31D93942504860797817E907E73
:10912000DC92C30002DD9296815F5C800522FB2603
:109130000EC102253C13858038158D067E92E84CC1
:10914000261D5AC101232AD7BC13868006158D0619
:109150007E97821386041AD6BC158D067E99A28B43
:1091600003260EC002270A13860206158D067E9A74
:1091700031968116C403260E8108252E1384802A79
:10918000158D067E9AD5C101260E8115251C138AE0
:109190002018158D067EA77EC103260E8113250A91
:1091A000138A8006158D067EA6B696815F5C8003C5
:1091B00022FB261CD7BC138A080AC1042506158D7C
:1091C00067E9E0B1386012DD6BC158D067E9FDC78
:1091D0008B0226215AD7BC1389800AC10325161594
:1091E0008D067EA0671389010CD6BCC10425061527
:1091F0008D067EA4279681810F2614138B080615F1
:109200008D067E94C1138B043E158D067E953F819D
:10921000014260A138B0823158D067E94F6811126D9
:10922000E138708221288801E158D067EA87E8167
:1092300012 2514138920037EB233968181142507E9
:10924000138940037EAF937E90681C00FFDF982057
:109250007181C00FF18DF98D699C000DD9A978187
:10926000CE92D218DE98847F81622608138540044E
:10927000C0021809C10A2626EC02A3001809180921
:1092800018A300261908088C92DC25ECEC02A30038
:1092900018ED001808180808088C92E625EE9E962E
:1092A00096802603DC9A39CC000039DE909C8E270C
:1092B00021CC55AA973AD73AA60009E60009ED0154
:1092C000DF901490108C1BFF25068F84EF8FED012B
:1092D000DF9239CE931CDF6827A973ECCB31F87984
:0892E00041C59107D255168229
:1092E8005AD79E5AD7A07F009F969E4CC609DE92F9
:1092F800BD971B2639BD9573812A27078150262ED5
:109308007C009F7A009E270FBD95702721812A2710
:109318001D367A009E26F1EC27DDA3EC17A315E392
:1093280025ED27BD9570812A2709DCA3ED139E96AC
:109338007E9171129F0103BD976018CE010096A01F
:1093480027343318E70018084A26F713852027BD65
:10935800093DC17188C010025D52712183CBD93DC27
:10936800102A028B2B188C010022F218384D26BEC9
:109378001385100218084F978313850824188C0149
:109388000000232597A3188FC000CE010018CE010036
:10939800A600BD9408085A26F796A32704BD94652D
```

```
:1093A8004F13850403BD946B361385400FCE01001F
:1093B800862ABD947C862A18A7001808CC41301349
:1093C8008520075C12851002CB02DB83DD82328A9E
:1093D800627E9251180918E600C03024153C36CE3A
:1093E800940117C624A1002706085CC12B26F63273
:1093F8003839C10A2502C00739FDFEF0F4FFFBF534
:10940800037D6A3270D8041811A251B8B4136178D2E
:109418004C32812B270C812F270881252704812492
:10942800263797A333391483044CC124272B8B2068
:10943800C12F27258B40C12B271F8BBA81202519C7
:109448008B1B814025138B1B8160250D8B1B2A09E3
:10945800163CCE96953AA600387F00A33318A7008D
:10946800180839B6010081202608CE01008D15861E
:1094780080394F39180818DF9CE600A70017089CA8
:109488009C26F63918DF9CA601A700089C9C26F7A5
:10949800180939814327078148264873009FBD95DD
:1094A800702740884097A3BD957027377D009F2B74
:1094B80004813220338143202FDE927F009FBD95A7
:1094C800732720815727078131226C873009FBD95D0
:1094D800702710097A3BD957027097D009F2B0781E2
:1094E8004127077E9205815726F986802070DE92F3
:1094F8007F009F8D762726815727078131261E7387
:10950800009F8D642717B701008D5D2710B70101F3
:109518008D5627097D009F2B07814127107E923A9F
:10952800815726F9B60101F60100FD0100C6FFF7D3
:109538000102CC8040202EDE927F009F8D2D2719BE
:1095480081 4B27078155261173009F8D1B270A978A
:10955800A38D152704814B27037E92478681C6FF7A
:10956800F70100D6A39E9639C6143A13850239C668
:10957800058D74DC98939ADDA104D3A1DDA18D6AD1
:10958800DC98939A93A12220DC98D39A04BD962163
:109598002B14C128241218CE96BD139F0102CB2C80
:1095A800183A18A600394F39EC01A313040404DD56
:1095B800988D662BF1C12825DDD79CEC01A3039378
:1095C8009824E3EC05A307939824DBEC09A30B93F9
:1095D8009824D3EC0DA30F939824CBEC11A31393E9
:1095E8009824C3D69C20AF3C2005C6043C0808D765
:1095F8009DEC01A303DD98DD9A7A009D2719C60426
:109608003AEC01A3031A93982304DD9820EB1A93EC
:109618009A24E6DD9A20E23839DD9AEC03A3059313
:109628009A241DEC07A309939A2432EC0BA30D93FB
:109638009A244CEC0FA311939A25328D33CB14390D
:10964800EC07A309939A2444EC0BA30D939A24489E
:10965800EC0FA311939A24158D16CB1E39EC0BA38E
:109668000D939A2437EC0FA311939A2503C68039DA
:1096780013850206BD98D57E98F5DC987E98F5ECA2
:10968800FA311939A24E68DE7CB0A39EC0BA30DAF
:10969800939A2416C6292006C62A2002C62B37EC20
:1096A800FA311939A3325C55D39EC0FA311939A33
:1096B80024BBC628393031323334353637383 94A45
:1096C8004142434445464748495 44B4C4D4E4F5000
:1096D8005152532A55565758595A2D2E20242F2B5C
:1096E800254641484745444A43424936313837358B
:1096F80034303332395A552E2D59582A575620505E
```

−28−

```
:109708004B52514F4E544D4C53252B2F2400406043
:109718007F7F7F128A01024F393CDD987A009827B3
:10972800248D24DD9C8D20DD9A939C2711250440EF
:10973800050820005055D39A2504D39C2207DC9A9C
:109748007A009826DE3839EC0137D699583A33A38F
:109758000113990102080839300B089C9624171843
:10976800DE96A60018E60018A700E70008180918F2
:0A977800DF829C8225EC148D02397B
:10978200D79ED7A058D7A17F009F969EDE92C6088B
:109792003ADFA2C60ABD971B2625BD98B2DE92EC1F
:1097A20001A30393982418EC03A305939A2410ECC5
:1097B20005A30793982408EC07A309939A253096EA
:1097C2009EDE92C6063ADFA2C60ABD971B266FBD71
:1097D20098B2DE92EC01A303939A2462EC03A305F0
:1097E2009398245AEC05A307939A25527C009FDE96
:1097F200A2DC98BD98F52B46370808DC9ABD98F58F
:109802002B3C37C6123A7A009E2705BD98B220E15A
:10981200129F012FEC01A30393982522EC03A305C9
:10982200939A241ADE9618CE010096A1E600CB3058
:1098320018E7000918084A26F3148D0220329E9672
:109842007E9153EC01A303939824F3EC03A30593B5
:109852009A24EBEC05A307939824E318CE01009613
:10986200A133CE99983AE60018E70018084A26F183
:1098720013864010CE01004FD6A18D1D26C0128640
:1098820020021809CC4930138640075C1286200258
:10989200CB02DD8286657E9251AB0019AB0019AB1B
:1098A2000019085A2707AB0019085A26EC840F3909
:1098B2001286100CEC01A3158D2D04DD98DD9A396A
:1098C2008D11DD98EC01A315939A8D1BDD9A180971
:1098D200180939EC01A303E305A307E309A30BE38A
:1098E2000DA30FE311A313DD9A04D39A04D39A04B0
:1098F200040439DD9CEC01A303939C2427EC05A30B
:1099020007939C243BEC09A30B939C2447EC0DA3E7
:109912000F939C250CC60737EC11A313939C332499
:109922005FC68039EC05A307939C2434EC09A30B92
:10993200939C244EEC0DA30F939C244AC60120D77E
:10994200EC09A30B939C2442EC0DA30F939C243EA1
:10995200C60220C3EC0DA30F939C2436C60420B785
:10996200C60337EC09A30B939C3324B537EC0DA344
:109972000F939C3324AB37EC11A313939C3324A194
:109982005D39C60520E6C60820ECC60620DEC609FB
:1099920020E4C60020E0363138373534303332039EE
:1099A200D7A0D7A17F009F17DE92C6083ADFA2C6D2
:1099B20009BD971B2628BD9ABE2723DD9CDE92ECAB
:1099C20005A307939C25037C009FDEA2DC9CBD9827
:1099D200F52B0B377A00A0270ABD9ABB26F09E967C
:1099E2007E9171CC5230DD82EC19A31B939C24EE44
:1099F200EC15A317939C139F011924E296A118CE8C
:109A0200010033CE99983AE60018E70018084A2672
:109A1200F1201725C996A1DE9618CE0100E600CBEB
:109A22003018E7000918084A26F386667E9251D755
:109A3200A0D7A17F009F17DE92C60C3ADFA2C6090B
:109A4200BD971B2608D75271CDD9CDE92EC01A3A1
:109A520003939C2510EC05A307939C250BEC09A30B
```

-29-

```
    :109A62000B939C250E7E99E07C009FEC09A30B933F
    :109A72009C25F2DEA2DC9CBD98F52BE9377A00A08A
    :109A820027068D3526F120DDCC5330DD82EC1DA377
    :109A92001F939C25D0EC15A317939C139F010D24B3
 5  :109AA200C4EC19A31B939C25BC7E99FE25B7EC1927
    :109AB200A31B939C24AF7E9A17C6143ABD95F2EC71
    :109AC20001A31304040404D39A939824024F39BDCA
    :039AD20098D539EB
    :109AD5007F009FBD9CA02B1D79009FD7A27A009E79
10  :109AE500270BBD9CB32F0E377A009E26F5BD9CB380
    :109AF5002A035424059E967E91AAD7A17F0083123E
    :109B05009F0103BD9760BD9C4F25EACE010096A03D
    :109B1500270733E700084A26F91384081396A1811D
    :109B2500442607128404CE148D0496A28144272F5F
15  :109B35001384401A8F188FDCA1129F010117CE01E3
    :109B450000BD947CDCA1139F010117A700088C01BF
    :109B55000027A2CC4630DB83DD8286617E924ADF18
    :109B6500A5DE92EC01DDA796939891261D861497A4
    :109B75009CBD92AB26147A009C26F6138404037EC2
20  :109B85009AFA148D04DEA57E9B35CCFFFFDD947F0C
    :109B95000081BD92AB27E496818107251AEC01A3CC
    :109BA5001BDD940404D3940404DD94EC1BA31D93E2
    :109BB500094250486069781 7C0081BD92AB270DA371
    :109BC50003939425CDDC92C30002DD92968116C4E1
25  :109BD5000326A8810825A4BD9CA02B1D251BD7A263
    :109BE5007A009E270BBD9CB32F0F377A009E26F572
    :109BF500BD9CB32A04C1882409864497A29E967EFB
    :109C05009B80128C040CEC0F93A70404040493941A
    :109C150024E7129F0103BD97608D2F25DCDEA596F5
30  :109C2500A0270B139F010D33E700084A26F914837B
    :109C3500017E9B2F18DEA5CE0100DFA532BD947CE9
    :109C45007A00A027E9DEA50820F0138420267D00F0
    :109C5500A02723148302DCA11B80823008088D18FD
    :109C65001B089C9623F8840F260C12841006148377
35  :109C7500047A00A00C390D39E600C0302411CB055B
    :109C85002503C60B3918CE9C9B183A18E60039C136
    :109C95000A2502C60C390F000A0E0D44444A979E48
    :109CA5004A97A0DE928D0A2A02543986FF39C610DA
    :109CB5003A8D142B1018CE9DDB139F0102CB18187B
40  :109CC5003A18E600395F39C604BD95EFDC98128471
    :109CD50002060404D3982002D39A04DDA3EC01A361
    :109CE5000393A3241AEC05A30793A3242FEC09A33C
    :109CF5000B93A3243CEC0DA30F93A3255D2078ECD7
    :109D050005A30793A32437EC09A30B93A3243BECEA
45  :109D15000DA30F93A324438D5ECA0339EC09A30B4E
    :109D250093A3242AEC0DA30F93A3242E8D49CA02D5
    :109D350039EC0DA30F93A324218D3CCA0139EC09FD
    :109D4500A30B93A32417C6142006C6152002C61616
    :109D550037EC0DA30F93A333240DC68039EC0DA367
50  :109D65000F93A324F5C617378D67DCA304D39A1A7E
    :109D750093983325E55D398D58DC981284020604E5
    :109D850004D3982002D39A04DDA3EC03A30593A37F
    :109D95002413EC07A30993A3241EEC0BA30D93A393
    :109DA50025B8C60039EC07A30993A32419EC0BA326
```

```
:109DB5000D93A324A5C60C39EC0BA30D93A3240383
:109DC500C60439C60839EC0BA30D93A3248CC61021
:109DD50039C6037E95F430313435322D24398688E1
:109DE500828536373833848389872F3A2B2E33384B
:109DF500373639242D320000008435343130008265
:069E050088863A2F2E2B87
:109E0B005AD79E5AD7A1D7A07F009F969E4CC605C6
:109E1B00DE92BD971B2634BD9EE12B07C136262B48
:109E2B007C009F7A009E270BBD9EDE2F1E377A008B
:109E3B009E26F5EC17DDA2EC0FA30DE315ED17BD78
:109E4B009EDE18DEA21AEF0B5D2B059E967E91C44B
:109E5B00129F0103BD9760CE010096A1270733E740
:109E6B0000084A26F9D6A15A860A138A040A5A8D83
:109E7B003026D8D6A15A86098D2726CF138A0401FE
:109E8B00093CCC3A2DA1002602E700098C00FF26E5
:109E9B00F438CC4832138A04015CDD8286687E92EA
:109EAB004A979E4F4CD09E22FBDB9EDDA2CE01003B
:109EBB004F5FCB30E0002402CB0B1024028B0B083E
:109ECB007A00A326EDD69ED7A37A00A226E38B3089
:109EDB00A00039C60C3A8D2E2B1018CE9EF7139F6F
:109EEB000102CB0D183A18E600395F3930313233A5
:109EFB003435363738393AFF00393138373534FF96
:109F0B003332303A3600EC01A30BDD9804D39804BE
:109F1B00D398040404DD98EC01A30393982423EC59
:109F2B0003A30593982446EC05A3079398245DECB3
:109F3B0007A3099398246CEC09A30B9398256FC680
:109F4B000039EC03A3059398C6032465EC05A3071E
:109F5B009398C6052465EC07A3099398C608246556
:109F6B00EC09A30B9398C6012465C60939EC05A32C
:109F7B00079398C6062444EC07A3099398C60C24B0
:109F8B0044EC09A30B93982525C60239EC07A309CA
:109F9B009398C60B242FEC09A30B9398C604242F7C
:109FAB00C60A39EC09A30B93982503C60739C6FFDC
:109FBB003937EC05A30793983324F337EC07A30940
:109FCB0093983324E937EC09A30B93983324DF5D83
:019FDB00394C
:109FDC005AD79E5AD7A07F009F969E4CC605DE92FC
:109FEC00BD971B261EBDA0362A19D79F7A009E2727
:109FFC000BBDA0332F0D377A009E26F5BDA033D1B3
:10A00C009F27059E967E91F5129F0103BD9760CE0A
:10A01C00010096A0270733E700084A26F9CC5830F0
:10A02C00DD82866D7E924AC60C3ABD9F112B1018AC
:10A03C00CEA04D139F0102CB0D183A18E600395FE4
:10A04C0039FF3132333435363738FE003039FF3191
:0BA05C003837353430333200036391D
:10A067005AD7A3D7A45AD7A25AD7A5148D01DE92DF
:10A07700BDA27881FD27133680678103244CC6066D
:10A0870096A44CBD971B274F2040BDA2CA81FE2630
:10A0970039C60696A44CBD971B262F7A00A3270C1A
:10A0A700C60CBDA2CC36816725F1201EEC19DDA6B2
:10A0B700EC17A313E317ED19C60CBDA2CC18DEA647
:10A0C7001AEF0D3680678103251C9E967E91E5BDAC
:10A0D700A275816724F4367A00A326F3BDA27581A1
:10A0E700FE26E7BD9760BDA2FC26DF30DFA0CC438C
```

-31-

```
     :10A0F70030DD82866A9781BDA219C067BDA1172787
     :10A10700C996812B0813891004138301BD7E9251D0
     :10A117009F9E96A297A318CE0100CEA22D583AEE85
     :10A12700006E0038D6A3D0A227035A260314830152
 5   :10A137005A2603148302C681203938148180C682C7
     :10A14700203138D681C401CA82D781C683202438FA
     :10A15700C684201F27F9C16027E8C16127DCC166D3
     :10A1670027C1C167264238D6A3D0A25A260B14832B
     :10A17700046801389083120 2AC680202638200289
10   :10A187008D1BBDA219C06025F7CEA23B8D8F20F293
     :10A197008D00BDA21AC1658DBBC0602430CB2025C0
     :10A1A70002CB6018E700180839BDA12B200538201D
     :10A1B700028D1C8D5DC06025F8CEA251BDA1242063
     :10A1C700F28D028D008D4CC1648D89C0602452CB05
15   :10A1D7008020D0BDA12B200D8DEB20098DE520051A
     :10A1E7003820028D1B8D2BC06425F8CEA267BDA138
     :10A1F7002420F28D028D008D1ABDA165C064242133
     :10A20700CB64862F4CC00A24FB18A7001808CB3A4A
     :10A217002091864F7A00A22B09DEA0E60008DFA076
20   :10A22700394F9E9E4D39A189A1BAA1ECA1B0A1DAFF
     :10A23700A1DFA1E3A14AA142A1CCA1E7A1B5A15702
     :10A24700A12BA16EA1CAA1FCA1FAA14AA142A19981
     :10A25700A1E7A157A184A12BA16EA197A1FCA1FA07
     :10A26700A1B5A184A12BA16EA1CCA1CAA1C8C60C7E
25   :10A277003A8D18EC07A30B8D29EC05A3098D23EC68
     :10A2870003A3078D1DEC01A3052053EC01A30DDDEE
     :10A2970098270A04D398DD9AC601D79C39313186AD
     :10A2A700FF39DD9E0505138D0102D39E05D39E93CD
     :10A2B7009A25EA7C009C939824F9DC9C0404860187
30   :10A2C700DD9C39C6023A8DC3EC03A3078DD4EC0598
     :10A2D700A3098DCEEC07A30B8DC8EC09A30D8DC286
     :10A2E700D69D18CEA327128D010418CEA5B6183A0D
     :10A2F70018A6004A39DE96A600408B67095F7D00E5
     :10A30700A52711E0002402CB671024028B67097A86
35   :10A3170000A526EFAB0080678167250280674D396E
     :10A327000324003100000000005F00230600000244
     :10A337000000170927003D13000000002D0026002C
     :10A3470000380030000000000066003719000000E8
     :10A357000B00001C3B3E500014004D00018153A0A34
40   :10A367002A004E1E00000000033002900000010CCB
     :10A377000000000000000000000000000044450000212C
     :10A387006300FF4B000000006700620000004A57AF
     :10A397000000000000000000000000001A1B00005C25
     :10A3A7000000064002E10000000002F0039000000009C
45   :10A3B70000000000006500600000004F5461003C4C45
     :10A3C7000000220005E00004100005D0000400051 00D7
     :10A3D700000D004625002C00004758002B000059AF
     :10A3E700360F34070800001635493F000E004800B5
     :10A3F7000000000111200005B000000000000000D8
50   :10A40700280032000068550 0FE000056006A006907
     :10A4170001050000002043000052 0042045A531F68
     :10A427005AD7A1D7A25AD7A0158D01DE92BDA2781F
     :10A4370081FE272581FD265AC60696A14CBD971B8E
     :10A447002650BDA2752B4B367A00A026F5BDA27506
```

-32-

```
:10A4570081FD263EBD9760203EBDA2CA81FD263202
:10A46700C60696A14CBD971B2628C60CBDA2CC2BB1
:10A4770021367A00A026F3EC19DDABEC15A313E324
:10A4870017ED19C60CBDA2CC18DEAB1AEF0D81FD76
:10A4970027059E967E91F5D6A2C003D79ED7A9C061
:10A4A7001422FAD69E5CD7AAC00F22FACC0000DD90
:10A4B700A3DDA5DDA7D69E5C30A6009BA3812F2533
:10A4C70002802F97A39BA4812F2502802F97A47A20
:10A4D70000A926149BA7812F2502802F97A77F000D
:10A4E700A37F00A4861497A9A6009BA5812F250208
:10A4F700802F97A59BA6812F2502802F97A67A00EC
:10A50700AA26149BA8812F2502802F97A87F00A534
:10A517007F00A6860F97AA085A269EDCA790A32637
:10A5270004E00027037EA49918CE01007F00A07DD8
:10A53700009E276732D6A02708800A811A25218B1B
:10A547000A812B250497A0204D8124250916CEA525
:10A557008B3AA60020388B30813923328B07202E87
:10A567004CC12B27298B20C12D27238B40C12E2798
:10A577001D8BBA812025178B1B814025118B1B81D1
:10A5870060250B8B1B2A0716CE96953AA6007F00EF
:10A59700A018A70018087A009E2699BD946BCE478D
:10A5A70030DF828A697E92512D2E20242F2B2500A1
:10A5B70000000000000000000000011A000020090050
:10A5C7000000000000000000000000000001500006F
:10A5D70000000000000000000000262E0000002700F9
:10A5E7000000000000000000000E1F00002D0F00FB
:10A5F7000000000000000000001000000000000044
:10A6070000000000000000000000A00000000000039
:10A61700000000000000000000000000000000033
:10A627000000000000000000000280000000000FB
:10A6370000000 2A000000000000000000000000E9
:10A6470000000000000FF0000000000000000000301
:10A65700180000000040000 00FE0816170000022280
:10A66700000012130000000000000290011210063
:10A6770000000 2F00000000000000000001423006D
:10A687000002400000000000000000000000000D92
:10A6970000000000000000 2B000B1D1E00000C072F
:0FA6A70000000 1C0000000250005192C001B06F8
:10A6B6004444979E979F4A97A0DE92EC0305A30514
:10A6C600A3012A41C6043A969EC608BD971B2630AA
:10A6D600C610D7A1EC0305A305A301C6043A497920
:10A6E60000A124F0D6A1C10A2416CB30377A009EE9
:10A6F60026DEEC0305A305A3012B05BD97602041CB
:10A706009E967E91AAC6063A969EC608BD971B26B9
:10A71600EFC6F8D7A1EC0305A305A301C6043A4981
:10A726007600A124F0D6A153C1A024D45454545485
:10A73600CB30377A009E26D9EC0305A305A3012B5F
:10A74600BFDE964FAB0019097A009F2711E6005825
:10A75600C1692502C0091B19097A009F26E6840FE4
:10A76600269ECE0100D6A032A700085A26F9CC4D67
:08A7760031DD8286677E924A04
:10A77E0044444A4A979E979FDE928D0A810B272F5B
:10A78E0081032775204886089 79DEC03050505A3D0
:10A79E0003A305A305A305A301A301A301A301C65A
```

```
:10A7AE00043A4976009D24E2969D444444443996E9
:10A7BE009EC608BD971B26168DCC367A009E26F8AF
:10A7CE000808BDA7E181032605BD976020459E962A
:10A7DE007E91AA861F979DEC03050505A303A3058D
:10A7EE00A305A305A305A301A301A301C6043A492A
:10A7FE0079009D24E2969D43390808969E4CC60822
:10A80E00BD971B26C98DCC367A009E26F88DC48145
:10A81E000B26BB30DFA0D69F5A5A3AEC0058585838
:10A82E00581B979CC6979CA0271C09A6000D49484B
:10A83E0048484827F12408D79DD89CD79CD69D54CC
:10A84E0024F0C89720EC969C2684CE0100D69F5A01
:10A85E005A328B30813A25082604865820028B07FF
:10A86E00A700085A26EBCC5030DD82866E7E924AC7
:10A87E007F00B2DE92EC0DA315BDA9382426080880
:10A88E00CC0604BD9721261CC602BDAD0718CE010D
:10A89E0000BDAD5C240EBDA94A2409BDAB8FD6A563
:10A8AE0054542031DE92EC07A30F8D79BDA94624B6
:10A8BE0035EC3305A32BA33D2A2C0808CC0604BD8A
:10A8CE0097212622C636BDAD07BDAD412418BDA9C0
:10A8DE003E2413D6A4CEAED73AE6002A09863150CE
:10A8EE0014B210BDAA497E924726631387105FDE0D
:10A8FE0092EC0DA3158D3324550808CC0604BD9794
:10A90E0021264BC602BDAD0718CE0100BDAD5C249D
:10A91E003DBDA94A24387F00B2BDAB8FD6A5545495
:10A92E00BDAA3D2029DDB07EAD928DF98D0E241D80
:10A93E008D0A24198D0624158D022411EC010808A8
:10A94E00A303DD9C050505939C939A939839DE929B
:10A95E00EC07A30F8DCF8DE024687F00B2EC2305AA
:10A96E00A31BA32D2A07138840587EAADCEC3305BF
:10A97E00A32BA33D2A4C0808CC0604BD97212642E2
:10A98E00C636BDAD07BDAD412438BDA93E2433D674
:10A99E00A4CEAE973AA60027292A7DD681C11E25C0
:10A9AE00214097A3DEAE0909CC0604BD97212612DD
:10A9BE00BDAD5C240DBDA94A240812A38007D6A5FF
:10A9CE0027177E90F8D6A55454CEAE973AA60027F8
:10A9DE00F1402BEE97A3BDAB8F96A3CE0100C60C14
:10A9EE00BD989B26DD18DEAA96A381302604128719
:10A9FE008010138880CCCE0100BD947C18DFAA7E17
:10AA0E00AB39128740002180912872006CE0100BD0D
:10AA1E00948C18DFAA7EAB4D138710A6BD92AB2780
:10AA2E0008EC01A30393942599D6A48D022093CE0E
:10AA3E00AE973AE60027402B3E8630B70120F7014D
:10AA4E002BF70106FC0100FD0121FC0102FD012393
:10AA5E00FD0128FC0104B70125B7012A8630B70194
:10AA6E0026B70127C1332310B70128B70129C134F6
:10AA7E002713F7012A2011392605B701282003F7DD
:10AA8E0000123B70124B70125CE0120C60CBD989B2A
:10AA9E0026E518DEAA13870114CE012118CE010077
:10AAAE00A60018A7000818088C012B25F31387049D
:10AABE0008B6012BB7010A180813870209B6012040
:10AACE00CE0100BD947C18DFAA31317EAB4D96814C
:10AADE0081162554080BCC0404BD9721264AC626A3
:10AAEE00BDAD078610BDAD43243EBDA93E2439DE63
:10AAFE00AE0909CC0404BD9721262D8608BDAD5E96
```

-34-

```
:10AB0E002426BDA94A2421EC03A30793982519DE18
:10AB1E00A48C0F0027078C00F0260D8D64CE01004B
:10AB2E00CC0008BD989B27037E90F8128820037AEC
:10AB3E0000AB14B202138803239688484820060613EC
:10AB4E00880C19968897A512B201048D3F2003BD7B
:10AB5E00AC65CC0C3395B22609148D0412881017EF
:10AB6E00C6308645DD82CC6302D88DD78D13B202F6
:10AB7E00014CDEAA7E924A13B210037E92477E905B
:10AB8E00F814B201CE010018097E976ADEAEEC0110
:10AB9E00A30305939A254F04939A244AEC03A30723
:10ABAE00BDA9502441EC05A309BDA95093982436A4
:10ABBE00EC11A315BDA950242DEC1DA321BDA95048
:10ABCE00242813A50420EC29A32DBDA9502417EC8D
:10ABDE0035A339BDA950240E86088D1C24088D3846
:10ABEE00260418DFAA3915B20C3913A508F88640C9
:10ABFE008D0624F28D4420E897A4C6083A18DEAAE2
:10AC0E00862018A7001808BDAD7C240BBDAE4AC621
:10AC1E000C3A7900A424F03914B204DEAA08CC0050
:10AC2E0005BD98A8161B191B19D6A4CEAED73AE6A9
:10AC3E0000270410840F3986013914B208DEAAECFD
:10AC4E0001481B9BA48403810339D79DBD92AB277A
:10AC5E00E67A009D26F639CC050DDD9C7A009C2700
:10AC6E00F5BD92AB27F68DE426ECDCB0BDAD92ECD3
:10AC7E001BA31D05939A25DE04939A24D9EC17A3E2
:10AC8E001BBDA95024D0EC15A319BDA9509398242F
:10AC9E00C5EC09A30DBDA95024BCDFA6C612BDACE0
:10ACAE00582627EC21A325BDA950241E13A504A6C2
:10ACBE00EC15A319BDA950249DEC09A30DBDA950F7
:10ACCE002494CC08308D117EABEA13A50888DEA63D
:10ACDE00CC400C8D037EAC0097A43A18DEAA8620D9
:10ACEE0018A7001808BDAD9A240E8F83000C8F5D37
:10ACFE00BDAE4A7900A424ED393CDE923AEC01A3B4
:10AD0E0003E305A307DD9AEC01A30938939ADD98B6
:10AD1E00D39A7F00A204040404DDA62715DC9893C1
:10AD2E009A25087C00A293A624F9397A00A2D3A60C
:10AD3E0024F939860497A418CE01008D31242EBD36
:10AD4E00AE4AC6083A7900A424F1C60C2015862016
:10AD5E0097A58D382417BDAE4AC6083A7600A524AD
:10AD6E00F1C606DFAC3ADFAE18DFAADEAC398D10C5
:10AD7E00EC03A305E307A309DDA0EC05A309201C42
:10AD8E00EC01A309DD9804D398DD9A398DF2EC011C
:10AD9E00A303E305A307DDA0EC01A305DD9C0505D8
:10ADAE005939C939A2523DD9CEC03A307DD9E055A
:10ADBE000505939E939A2512DD9E9398252A9398C6
:10ADCE0025429398255A939825020C39DC9C93982A
:10ADDE00250D9398250C9398250B9398C66639C626
:10ADEE006739C66A39C66B39DC9C9398250D9398E2
:10ADFE00250C9398250B9398C66D39C66C39C6737E
:10AE0E0039C67239DC9C9398250D9398250C93982E
:10AE1E00250B9398C66039C66139C6C839C6CB3979
:10AE2E00DC9C9398250D9398250C9398250B93985D
:10AE3E00C66939C66839C6C739C6C4392A4437DC2B
:10AE4E0098040404DDA84FD6A2DDA6DCA0050505F6
:10AE5E0093A07D00A227122B0993A87A00A726F9AA
```

```
:10AE6E002007D3A87C00A726F97C00A6939824F986
:10AE7E0096A6335425068103230620068104230259
:10AE8E00CB0C5418E7001808398000000000000B1
:10AE9E003000000031003233000000003400377383B
:10AEAE000000035390036000000000000CA00C7CB94
:10AEBE000000C8C900CC00000000CDCE00CF0000BD
:10AECE0000000000000000D000000000000000A4
:10AEDE00300000003100323300000000340037388FB
:10AEEE000000035390036000000000000CA00C7CB54
:10AEFE000000C8C900CC00000000CDCE00CF00007D
:09AF0E0000D0000000000000006A
:10AF1700DE92C6083ACC0506BD9721266ABDB0C2A7
:10AF270027652563D7A496A797A5BDB0BF27582542
:10AF37005696A790A54797A7D7A5D8A4C503264790
:10AF4700C40458DBA5C40FD7A8C644BDB10724372E
:10AF5700148D01DE92C605D7A9C608BDA2CC2A0664
:10AF670081FD2623866A3697AAEC03A305E307A388
:10AF770009E30BA30DBDB136240DC60C7A00A92633
:10AF8700DACE90E27EB00D9E967E90E2DE92C60A01
:10AF97003ACC0506BD97212668BDB0BF276324615B
:10AFA70096A7DDA4BDB0C22758245696A490A747FC
:10AFB70097A7D7A4D8A5C5032647C40458DBA4C4BC
:10AFC7000FD7A8C608BDB1072437148D01C605D70A
:10AFD700A9DE920909BDA2752A0681FD2623866A84
:10AFE7003697AAEC01A303E305A307E309A30BBD67
:10AFF700B136240D7A00A926DCBD9760CE92472092
:10B00700059E967E9247DFA2CE0B00D6A85858DB46
:10B01700A83AC605D7AC32A1002705A70014AC8013
:10B02700085A26F296AC2A5ECE0B00A6002B4EC617
:10B03700053A6D002B47800724F78B0797AD3A0930
:10B04700DFAAA600408B6B5F09E0002A02CB6B10DA
:10B057002A028B6B8C0B0022EF4D2621DEAA09A654
:10B0670000408B6B5F09E0002A02CB6B102A028B32
:10B077006B8C0B0022EF1027138B6B270F148D405F
:10B087009E96C6014F399E96DEA26E00CE0B01DF5B
:10B09700A0CC4B30DD82866F9781DCAA830B02D769
:10B0A700A2D6ADBDA11727DE8680180918A10027F3
:10B0B700F9180896817E9251C646815FDE923ABDA5
:10B0C700AD7C25025F392A0154C1722502C00437BD
:10B0D70054CEB1B73AE600D7AA7F00A7DCA0050592
:10B0E7000593A093987A00AA26F90505052B077CF6
:10B0F70000A7939824F97A00A7D39824F9335439F1
:10B10700DE923AEC01A303DDA096A797AB96A005C4
:10B117000505B3A09398050505057D00AB2B0793BF
:10B12700987A00AB2AF9D3987C00AB2BF92039DD4C
:10B13700A0D6AA18CEB17C183A18A600D6A7DDAAC1
:10B14700DCA00505D3A005D3A0939893987A00AA0D
:10B157002AF70505057D00AB2B07D39A7A00AB2AA2
:10B16700F9939A7C00AB2BF94D2A044050820004D6
:10B177000404939839020202010101010101014E
:10B18700010202020202020202020302020298
:10B19700020202020201010101010101010291
:10B1A7000202020203020202030202020276
:10B1B700020301020101010101010101010174
```

-36-

```
:10B1C7000101030102020202020202020202030358
:10B1D7000302020202020203030301010202445
:08B1E70003030305030305030344
:10B1EF00DE92EC43A347A301E3032A33C6023ACC12
:10B1FF000408BD97212628BDB37B2423FD0B76BD04
:10B20F00B37B241BFD0B74BDB37B2413FD0B72BDED
:10B21F00B37B240BFD0B70CC90E2CEB6F920479E8A
:10B22F00967E90E2DE92EC01A305A345E3472A2820
:10B23F00C6043ACC0408BD9721261DBDB338241887
:10B24F00FD0B70BDB3382410FD0B72BDB33824084D
:10B25F00FD0B74BDB33825059E967E923AFD0B7695
:10B26F00CC923ACEB6E9DDA7D6A6C40F3AA60027F0
:10B27F001897A418CE0B705FBDB436BDB42DBDB4F6
:10B28F002DBDB42D18E1072704DEA76E0018CE0BD5
:10B29F0070CE0B78D6A45858583AC608D7A518A61A
:10B2AF0000A1002705A70014A58018A608A740082D
:10B2BF0018085A26E996A52AD0B60BB82B30B60B2C
:10B2CF00FECE0B787F00A4C6087C00A43A6D002B3D
:10B2DF001D800724F48B0797A596A44848979E8155
:10B2EF0018250ECC0026CEB70BBDB45327037EB066
:10B2FF0084CC0110CEB70ABDB45326F2CC0214CEC3
:10B30F00B709BDB45326E796A4C6073DC12A240248
:10B31F00CB02D79ED79FCC5430DD82866C9781BDF0
:10B32F00B4EB27CA96817E92518D14273D18CE001B
:10B33F009E8D1D1808188C00A323F608082041CCF9
:10B34F000008E301A3110404DD9804D398DD9A39B2
:10B35F0086FF18A700EC01A30508080505939A2599
:10B36F0007186C00939824F939380C398DD127FAC6
:10B37F0018CE00A308088DD81809188C009E24F643
:10B38F0008083C96A316481B489BA116481B489BD0
:10B39F009F16CEB72B3AA6002BCF97A496A216488E
:10B3AF001B489BA016481B489B9E16CEB72B3AA650
:10B3BF00002BB697A5969E9B9F9BA29BA346CEC89C
:10B3CF00BF2503CEBFE37900A6D6A4583AEC00DD23
:10B3DF009E4FD6A405050505C3B80313A60103C3E5
:10B3EF0008DC8F7F00A0D6A55454542712A6000D59
:10B3FF0049270824FB7C00A00C20F5085A26EEA64E
:10B40F0000D6A5C4074924037C00A05A2AF74FD6BB
:10B41F00A0D39E8309612403C30961380D3918EB4A
:10B42F0007C1312502C031D7A518EC00CE0031027B
:10B43F0018E7098F18E708DBA5C1312502C03118BD
:10B44F0008180839979F7F00A0B60BFE3DDDA1D6E7
:10B45F009ED7A318CE0B808D1A7A00A326F918CE8B
:10B46F000BB8969F27078D0B7A009F26F9DCA11842
:10B47F00A3003918A600E6003DD3A0DDA0180818D8
:10B48F00A600E6003DD3A1DDA124037C00A07D0032
:10B49F00A0270E7A00A0832C2024067C00A0C32CAA
:10B4AF00207D00A027087A00A0839610200883969D
:10B4BF00102403C39610834B082403C34B08832522
:10B4CF00842403C325848312C22403C312C28309B5
:10B4DF00612403C30961DDA108180839CE0BC0DF51
:10B4EF00A018CE0100CEB4FFD6A5583AEE006E00DC
:10B4FF00B570B51CB58AB50FB553B558B50D4F39E5
:10B50F00BDB6C7C6015C10250426FA2054148180ED
```

-37-

```
:10B51F00204F969F909E4A26031483014A260314B8
:10B52F008302868120189 69F909E4A2607148304D3
:10B53F008682200A128908F8868020208683128945
:10B54F00081A201DCEB6692003CEB694BDB6BF81B2
:10B55F002B250520A9CEB63E163AA60018A700182F
:10B56F0008BDB6C7812B25EDCEB528167EB4F9B52B
:10B57F0053B558B521B535B54BB58ABDB6C7813072
:10B58F0027DFD69E27CF16BDB6C7813026031720DB
:10B59F00C497A686303DDBA68900DDA5D69E27077A
:10B5AF00BDB6C781302606DCA58D5B20B43696A5C7
:10B5BF00C6303DDDA496A6C6303D9BA524037C0076
:10B5CF00A4DDA54F33D3A524037C00A4DDA57D0006
:10B5DF00A4270C8386A025048D1D209FC386A08DD4
:10B5EF000220988D42186C0083271024F87A00A44B
:10B5FF002AF3C3271018088D2E186C008303E82434
:10B60F00F8C303E818088D1F186C0083006424F832
:10B61F00CB6418088D11186C00C00A24F9CB3A18A6
:10B62F000818E70018083936862F18A70032393066
:10B63F0031323334353637383941424344454647 42
:10B64F0048494A4B4C4D4E4F5051525354555657F3
:10B65F0058595A2D2E20242F2B25271B1C1D1E1FFA
:10B66F00212223260102030405060708090A0B0CF1
:10B67F000D0E0F10111213141516171819 1A282959
:10B68F00002A2C3A3F5E3B3C3D3E3F405B5C5D6198
:10B69F00626364656667686 9 6A6B6C6D6E6F707103
:10B6AF0072737475767778797A5F607F7B7C7D7E35
:10B6BF007A009E2A084F38397A009E2BF912A1077B
:10B6CF0002200D7C00A1969E8104240486F897A188
:10B6DF003CDEA0A600387C00A1390800000400025F
:10B6EF000600000105000300000708000003000525
:10B6FF00060000010200040000070109 1F1A020CD6
:10B70F001117251216061B2C0F2B270B0D052921A0
:10B71F002408042003132819 1D0A181EFFFFFFFF1A
:10B72F00FFFFFF00010203040506070809 0A0B0CBF
:10B73F000D0E0F10111213141 5FF161718 19FFFF06
:10B74F001A1B1C1D1E1F20212223242526272829D2
:10B75F002A2B2C2D2E2F30FF31323334FFFF35366D
:10B76F0037FFFFFF38393A3B3C3D3E3F40414243B4
:10B77F004445464748FF494A4B4CFFFF4D4E4FFF4C
:10B78F00FFFF5051FFFFFFFF525354555657585963
:10B79F005A5B5CFF5D5E5F60FFFF616263FFFFFFEF
:10B7AF006465FFFFFFFF66FFFFFFFFFF6768696AC2
:10B7BF006BFF6C6D6E6FFFFF707172FFFFFF737425
:10B7CF00FFFFFFFF75FFFFFFFFFFFFFFFFFFFFFF04
:10B7DF0076777879FFFF7A7B7CFFFFFF7D7EFFFF17
:10B7EF00FFFF7FFFFFFFFFFFFFFFFFFFFFFFFFFFDA
:10B7FF00FFFFFFFF2AA0000A28000000000000 0042
:10B80F0000000000051550005555000000000000D9
:10B81F000000000028AAA80228AA80000000004B
:10B82F000000000010451681145528000000008C
:10B83F0000000000008228940082 2 29 500000 00047
:10B84F000000000001400000540000 280000 00002C
:10B85F000000000002AA80002AA00055500000003E
:10B86F0000000000001455400155500 28AA80000073
```

-38-

```
:10B87F000000000000A2A94008A2D0145528000023
:10B88F00000000000041148004512A082295000096
:10B89F000000000000020884000209104110A4000A1
:10B8AF0000000000015000001500002A00015006C
:10B8BF0000000000000AA80000AA800155000AA895
:10B8CF00000000000005168000552800A2D0055288
:10B8DF008000000000002894000229500512A0229B1
:10B8EF005000000000001048000110A002091811017
:10B8FF00A4000000080400000810010084008F4
:10B90F001200000000005400000500000A800050E3
:10B91F0015000000000029400002D0000528002D32
:10B92F0000A500000000148000012A0002950012FB
:10B93F00A052A00000000840000091000110A400939
:10B94F001821480000000040000000800008100000DA
:10B95F00841024000000002800000280000500000224
:10B96F00800A01400000001400000001500002A00017C
:10B97F00500540A800000080000000A000011800060
:10B98F00A402305200000004000000100000840000F7
:10B99F0012010809000000A00000000000000006A
:10B9AF00000000000500000055400000000000000DF
:10B9BF00000000000AAA0000A2AA0000000000005A
:10B9CF000000000005155000515550000000000053
:10B9DF000000000028AA280208A2D000000000000E2
:10B9EF0000000000001045128104512A000000000E1
:10B9FF0000000000A800000A2800005400000000000A
:10BA0F000000000000554000155550002AA00000000E
:10BA1F00000000002AAA000A2AAA8015550000007B
:10BA2F0000000000011455005155528008A2D0000050
:10BA3F00000000008A2290208A2D504512A000024
:10BA4F0000000000041108104512A002091800065
:10BA5F0000000000002A00000AAA0005550002A001C
:10BA6F000000000015500005555002AAA8015500E
:10BA7F000000000000AA280028AAD01555280A2D7A
:10BA8F0000000000045128014552A08A2D50512A7
:10BA9F00A000000000022090008229504512A420943
:10BAAF0018000000000001008004110A00209181009D
:10BABF0084000000000A000002AA800145002AA8A5
:10BACF0000000A00000005500001452800AAD0145224
:10BADF00805A00000002290000A2D500452A0A2D35
:10BAEF005025400000001108000412A002295841249
:10BAFF00A4123000000000800002091000010A420942
:10BB0F001A0108000000280000A5000052800A5AF
:10BB1F0000A502800000128A000052A000255005285
:10BB2F00A04AA1500000009000002150001 2A40217F
:10BB3F005825488C0000008000010A00001180107 9
:10BB4F00A40234420000001000000550000220005 4D
:10BB5F00500442A8000000080000002200015800 25F
:10BB6F002402B11200000000011000002400189
:10BB7F001A00488D00000001500000028000000008A
:10BB8F0000000000A800000AA80000555500000A7
:10BB9F0000000000055400005554400028AA800000015
:10BBAF00000000002A8A000228AA00145528000006D
:10BBBF00000000000114450011445200822950000098
:10BBCF00000000000088221000822140041 10A40001E
```

```
:10BBDF0000000000050000015540000AAA00015003E
:10BBEF0000000000AA80000AAAA0005555000AA86C
:10BBFF000000000051540000555450028AAD00552F9
:10BC0F0080000000288A200228AA5014552A0229F1
:10BC1F0050000000010441201144522082295811093
:10BC2F00A400000008020100082214041104008B1
:10BC3F0012000000054000000514000AAAA801450D5
:10BC4F0001500000028A00002AAA005145280AADBF
:10BC5F0000A500000144500011452028AAD5045228
:10BC6F00A052A0000082210008A25410452A4229A8
:10BC7F005821480000401000004122082295801OF2
:10BC8F00A4102400000140000014500028A50145231
:10BC9F00814A0140000A2000008A5001452A08A568
:10BCAF0050A540A8000412000004522008255845 27E
:10BCBF00A442B05200020100000214004 12A4021A8
:10BCCF005A2148090000050000000420000A55004284
:10BCDF00214AA110000021000002540004422402537
:10BCEF00588448AC0000100000002200021580 02AA
:10BCFF002442B41200000200000022000044800 21F
:10BD0F00240891120000010000000400000224000EE
:10BD1F004A0448250000002A0000005400002A00B1
:10BD2F00000000000500000155000002AA000155020
:10BD3F0000000000A280000A2A80001545000A2D8D
:10BD4F000000000005114000511440008A250051214
:10BD5F00A00000002088200208824004122020 92E
:10BD6F0018000000010040201004020002010810084
:10BD7F0084000000A000002AA800005140002AA85B
:10BD8F0000A00000550000145140002AAA001452D0
:10BD9F00805A00002288000A2A8A001145200A2DA5
:10BDAF0050254000110440041144 2008A2540412ED
:10BDBF00A412300000802002088244004122020 9B0
:10BDCF001A01080002800000A2800051450028A53A
:10BDDF0000A5028001140000514400228A5014 5221
:10BDEF00A04AA15000882000208A40114 5220 82532
:10BDFF005825488C00040200104420008254 84 12FD
:10BE0F00A402344200800000028A0001042028A581
:10BE1F00508442A800044000010420008A541042BC
:10BE2F00244AB112000020000082440004 220 82599
:10BE3F005A04488D000020000008400004220084AE
:10BE4F0048844A240000020000042000004480427D
:10BE5F0024089512000000000000440000000004B8
:10BE6F004A0022500000014000000A80000140082
:10BE7F0001500000A000000AA0000051 40000AA0DD
:10BE8F0000A500004500000451 00 00288A0004525C
:10BE9F000052A0002208000220880010442002 2136
:10BEAF00402148000100400001004000802 04001067
:10BEBF00201024004000000145000 00A280 001450F5
:10BECF00014A0140A2000008A2800051440008A5C9
:10BEDF0000A540A8411000045104002 08A400452DC
:10BEEF002042B052200800000208 84010442 00 0213A
:10BEFF0048214809050000000410000A28A001042B5
:10BF0F00014AA110020800002288 0041042008A560
:10BF1F00408448AC01004000010400208A440042E4
:10BF2F002042B412001000000010400020 84 010 4229
```

```
:10BF3F002108911200080000008400104200084 2D
:10BF4F0048844482500004000000000000084400001D
:10BF5F000108940000000028000000500000280095
:10BF6F0000A002804000001440000022800014 4016
:10BF7F00004A015082000008220000110400082 42A
:10BF8F000024408C4010000401000008040040 297
:10BF9F0000002104280000028A0000410000 28A0ED
:10BFAF00008402A8440000104100002288001042C3
:10BFBF00004A81120200000822080000000000 0061
:10BFCF00000000000000000000000000000000 0062
:10BFDF000000000004B004B904C804D904EA04F84E
:10BFEF0004FF05100525053C054F055D0569057D19
:10BFFF00059505AC05BD05C705D405E805FD060E7D
:10C00F000617062306340643064D064F06560663EB
:10C01F00067306830692069C06AF06C706E006F86F
:10C02F000709071B073507530771078907980 7ACDF
:10C03F0007C707E507FE080F0823083D08550866E0
:10C04F00087708880896089B08A908BC08D108E556
:10C05F0008F509060920093E095C09760987099E3A
:10C06F0009BC09DD09FB0A100A280A460A640A7B83
:10C07F000A900AA80ABB0ACA0AD80AE10AF20B08F0
:10C08F000B1F0B320B3E0B520B6D0B8B0BA60BBA10
:10C09F000BD20BF00C0E0C260C3D0C560C6D0C7EBF
:10C0AF000C8F0C990CA30CB50CCA0CDD0CE90CFC15
:10C0BF000D160D300D440D590D710D860D970DA8F0
:10C0CF000DB10DBB0DCB0DDC0DE80DF90E0C04B150
:10C0DF00514000055400000000000000000000 0067
:10C0EF002AAA800A2AA00000000000000000000019
:10C0FF0011455405155500000000000000000 00018
:10C10F0008A2A94208A2D0000000000000000 00011
:10C11F000041148104512A0000000000000000 00BB
:10C12F0002A0000028000054000000000000000 0E2
:10C13F00015500005550002AA0000000000000 02B
:10C14F0000AAA80028AA80155500000000000000D2
:10C15F000045168014552808A2D00000000000 0EA
:10C16F0000228940082295045 12A0000000000 0097
:10C17F00001048004110A0020918000000000 00DB
:10C18F00000A800002A0000150002A00000000 0F9
:10C19F00000554000155 0000AA8015500000000052
:10C1AF000002A94000A2D00055280A2D000000006F
:10C1BF000001148000512A00229505 12A0000000F2
:10C1CF00000008840002091 00110A420918000 0069
:10C1DF00000000400001008000810100840000002E
:10C1EF0000000280000 0A8000050000A8000A00000 41
:10C1FF0000000168000052800 02D00052805A00006F
:10C20F00000000940 00029500012A002950254 00036
:10C21F00000000480000 10A0000918010A4412300079
:10C22F0000000000400000810000840081201080 0D3
:10C23F00000000014000005000002800 0500502 80AA
:10C24F00000000008000002A0000150002A002 A1508B
:10C25F000000000 040000011000 00A40011801488C46
:10C26F000000000000000000800000100084002442CC
:10C27F0000000000500000000000000000000000AA
:10C28F00A800000A2800000000000000000000 00C5
```

-41-

```
:10C29F005540000555500000000000000000000050
:10C2AF002AAA000228AA8000000000000000000057
:10C2BF00114550011455280000000000000000037
:10C2CF0008A2290008229500000000000000000CD
:10C2DF050000015540000280000000000000006E
:10C2EF00AAA0000AAAA000555000000000000000FC
:10C2FF005155000555550028AA80000000000000088
:10C30F0028AA280228AAD01455280000000000000EF
:10C31F001045128114552A08229500000000000D4
:10C32F0008220900082295041104A0000000000AD
:10C33F0005400000555000AAA000150000000000A5
:10C34F0002AA00002AAA805555000AA800000000082
:10C35F00014550001555282BAAD00552800000002D
:10C36F0000A2290008A2D514552A02295000000066
:10C37F000041108004512A0822958110A40000006A
:10C38F00002008000020910411A4008120000004C
:10C39F0000150000014500002AA80145001500000052
:10C3AF00000A280000AAD00145280AAD00A5000008
:10C3BF000005128000452A00A2D50452A052A00009
:10C3CF000002090000229500412A42295821480005
:10C3DF000001008000010A0020918010A4102400A9
:10C3EF000000050000005280000A500052814A014009
:10C3FF00000029000002550052A002550A540A87D
:10C40F000000108000012A0002158012A442B052D1
:10C41F00000008000000110001A40011A2148091C
:10C42F000000028000002200005500022000AA11027
:10C43F000000010000001500002240015804480AC24
:10C44F000000008000000020000118000240234125E
:10C45F000000000A000000540000000000000006F
:10C46F005000001554000022AA000000000000003A
:10C47F00AA80000A2AA00015550000000000000045
:10C48F00515400051545008A2D00000000000001F
:10C49F00288A200208A25004512A000000000000040
:10C4AF001044120104412200209180000000007E
:10C4BF00A800002AA80000555002A0000000000024
:10C4CF00554000155540002AAA8015500000000065
:10C4DF002A8A000A2AAA001555280A2D0000000F2
:10C4EF001144500515452008A2D50512A0000000E3
:10C4FF000882210208A25404512A420918000000A0
:10C50F000040100104412200209181000840000AE
:10C51F0002800000AAA0005145002AA800A0000038
:10C52F00015400005145002AAAD01452805A00002D
:10C53F00008A200028AA5011452A0A2D50254000B4
:10C54F000044120010452208A2D58412A412300014
:10C55F00000020100082214000412A42091A010800B2
:10C56F00000A0000028A0001452828A500A50280C4
:10C57F0000045000014520008A551452A04AA150D2
:10C58F000002210000825400452A48255825488C76
:10C59F0000001000041220002158412A402344250
:10C5AF0000002000000A5000042200A5508442A879
:10C5BF0000001200004220002558042244AB112EA
:10C5CF0000000010000021400002240215A04488D8F
:10C5DF000000001000000440000224004480442A4E7
:10C5EF0000000000000002200000480022400952C9
```

```
:10C5FF0000000015000000A800001500000000005A
:10C60F00A000000AA800005540000AA80000000082
:10C61F00550000005514000028AA0005528000000077
:10C62F0022880002288A001445200229950000000A9
:10C63F0011044001104420082214011A4000002E
:10C64F000080200008020404010200081200000000C
:10C65F0050000014500000AAA00014500150000018
:10C66F00A280000AAA80005145000AAD00A5000073
:10C67F0051140004451440028AA500452A052A000A3
:10C68F0020882002288A401045220229582148007C
:10C69F0010040200104420082214801A41024005B
:10C6AF0005000000514000A28A001452814A014047
:10C6BF0002880000228A0051452008A550A540A8F5
:10C6CF000104400011442020808A540452A442B05265
:10C6DF0000080200008244104522002158A21480981
:10C6EF000014000001040002850104221AA110D8
:10C6FF00000820000008A4001042208A5588448AC95
:10C70F0000040200000420008254804224248B4122C
:10C71F000000400000042000084400422508911248
:10C72F00000020000000440004220044A84482531
:10C73F000000020000000000004480000008940088
:10C74F000000002A000005000002A0000A0000096
:10C75F00400000145000002A80001450005A0000BE
:10C76F00A200000A2280001144000A250025400083
:10C77F004110000411040008824004120012230000FE
:10C78F00200800020080400040200201080108003C
:10C79F00A0000028A0000051400028A000A50280A2
:10C7AF004500001451000022BA001452004AA15083
:10C7BF002208000822880011442008254025488CB3
:10C7CF000100400411040000082440412200234428C
:10C7DF00020000A28000041040028A5008442A8A6
:10C7EF00110000041040028A40104220448811279
:10C7FF0000800002088400104200825480B4488DC7
:10C80F0000008000002080010420208440844A240C
:10C81F00000040000010400000844104220089651257
:10C82F00000000000008400000000084480000225BE
:10C83F00000000014000000A000014000014001409F
:10C84F00800000008A00000510000008A000A400A86C
:10C85F0044000004410000208800044200428052E
:10C86F00020000002008001004000020402040009B2
:10C87F00400000010400000A28001040014A01104B
:10C88F0082000008A2000041040008A4008440AC0C
:10C89F0040100000041000020884004200429012EA
:10C8AF00040000004100008000000000000000000B4
:10C8BF00FFFF00080017002800390046004E005EF9
:10C8CF000730089009D00AA00B600CA00E200F8BC
:10C8DF001090111011D01310146015701610216D6E
:10C8EF017D018C01940196019D01AA01B901C935
:10C8FF001D701E101F5020D0227023F0251026348
:10C90F0027D029B02B902D102E002F40310032E52
:10C91F003480359036D0387039F03B003C003D27A
:10C92F003DF03E403F104040419042D043D044F51
:10C93F00469048704A504BF04CF04E50503052398
:10C94F0005410556056E058C05AA05C005D505EDF3
```

-43-

```
:10C95F00060106100061D06260637064D06630676E7
:10C96F000681069406B006CE06EA06FE07160734C1
:10C97F000752076A0780079A07B007C107D207DA7D
:10C98F0007E407F5080A081D0829083D085708712C
:10C99F000885089A08B208C708D808E908F308FDFF
:0CC9AF00090D091E09290938094C095C12
:10C9BB003936373CCE0240CCFFFEED0008088C091F
:10C9CB008225F7FD0236FD0234FD023EFD0230C624
:10C9DB0054FD0232CC0000FD023AFD023CB7022DA1
:10C9EB0038333239128C026FDE92EC03A30905DD6A
:10C9FB009FEC0FA311939F255EBDCFE3EC03A30721
:10CA0B008D582453EC05A3098D50244BEC0BA30F2D
:10CA1B008D482443EC01A3058D4093982449EC07E2
:10CA2B00A30B8D3693989398242DEC09A30D8D2A87
:10CA3B00939893982421BDCB8513B60117FE022E34
:10CA4B0086FFB7022EDCB593AF2509830032250490
:10CA5B008FBDCC53BDCB337E90A6DD9F0505050561
:10CA6B00D39F939A939839939824ECEC07A30B8D4F
:10CA7B00E924E4EC09A30D8DE124DCFC022EFF027A
:10CA8B002E4D2BD3158D0120C8128C0270DE92EC2B
:10CA9B0009A30F05DD9FEC01A303939F255FBDCF7A
:10CAAB00E3EC03A307BDCA652453EC09A30DBDCA70
:10CABB0065244AEC0BA30FBDCA652441EC0DA311F1
:10CACB00BDCA659398253993982432EC05A309BD0B
:10CADB00CA652429EC07A30BBDCA652420BDCBE98D
:10CAEB0013B60117FE022E86FFB7022EDCB593AFED
:10CAFB00250983003225048FBDCCB58D2B7E90C4C8
:10CB0B00EC05A309BDCA659398939824F0EC07A391
:10CB1B000BBDCA659398939824E3FC022EFF022E5B
:10CB2B004D2BDA158D0120D0138D0135B6023385CF
:10CB3B0001262EFC023C1AB3023E2418CC0000B393
:10CB4B0002384756F3023404040404F3023E1AB3CA
:10CB5B00023A240D8601BA0233B702339E968672CF
:10CB6B0039B6022D80202511B7022D9E96FC02347A
:10CB7B00B3023C0404045C534F39BDCFABBDCFCDE6
:10CB8B00255BBDD0E82B5618CE00FFBDD05897B70C
:10CB9B00BDCF9CD7B8DCAFC300108F9CB52426BD8E
:10CBAB00CFD32407BDD00025F2202FBDD0E82A100B
:10CBBB004C260A96A881072604DC9C270ACC0FFF7B
:10CBCB00BDD07220D02613181E00300EBDCF9CD1C5
:10CBDB00B8260A867A18A70218087ECD1639BDCF5B
:10CBEB00ABBDCFCD2561BDD0942B5C18CE00FFBD66
:10CBFB00D05897B7BDCF9CD7B8DCAFC300108F9C74
:10CC0B00B52429BDCFD32407BDD00025F22032BDDA
:10CC1B00D0942A134C260D96A881062607DC9C83FC
:10CC2B000480270ACC0FFFBDD07220CD2613181E0F
:10CC3B0000300EBDCF9CD1B8260D867A18A70218EE
:10CC4B0008148D027ECD6339C5022762BDCFC22584
:10CC5B0058BDD0E82B5318CE00FFBDD05897B7BDA9
:10CC6B00CF9CD7B8DCAF8300108FBDCFD32407BDCB
:10CC7B00D02D25F62030BDD0E82A134C260D96A8D2
:10CC8B0081062607DC9C8304802708CC0FFFBDD0D0
:10CC9B007220D1181E00300EBDCF9CD1B8260A864B
:10CCAB007A18A70218087ECD6339C502269EBDCF20
```

-44-

```
:10CCBB00C22557BDD0942B5218CE00FFBDD058972C
:10CCCB00B7BDCF9CD7B8DCAF8300108FBDCFD324BB
:10CCDB0007BDD02D25F6202DBDD0942A104C260A49
:10CCEB0096A881072604DC9C2708CC0FFFBDD072C9
:10CCFB0020D4181E00300EBDCF9CD1B8260C867ADE
:10CD0B0018A7021808148D02200139BDCF8718DF30
:10CD1B009EBDCF7A2B4118CE00FFBDCBE8D772B9C
:10CD2B00367D02322B318D71FB02328900FB0232D0
:10CD3B0089008F96A0840C97A8BDCDE17A00A3271C
:10CD4B00080909189C9E25F139189C9E24098D63AE
:10CD5B0012A00C037ECE9939BDCF8718DF9EBDCFB5
:10CD6B007A2BF418CE00FF8D4A8DE92BEA7D023227
:10CD7B002BE58D258F96A0840C97A88D597A00A34F
:10CD8B002709C6023A189C9E25F139189C9E24C788
:10CD9B008D2112A00CC17ECEED8F17581B13A00C4A
:10CDAB00064C13A008014CF602325CD7A3583DC3C6
:10CDBB0002403918A60218A800843018E60218E8B9
:10CDCB0004C4301B97A218EC021808180858580412
:10CDDB0004840FDDA0398DDB12A00CF9840C90A814
:10CDEB00272D2B14850427148FC30002FB023289D5
:10CDFB0000FB02328900201285042 7EC8F8300028E
:10CE0B00F002328200F0023282008F9BA897A8DCDE
:10CE1B00A00584078C02402560BC0236245B6D00A4
:10CE2B002B33E101260CA800850726048D2E202725
:10CE3B00A800DD9C8D0C13A2FF01391A939C2720AF
:10CE4B00DC9C1F00703FA6008010A7008570262970
:10CE5B00CCFFFF201E8D2313A2FF01391E0070197A
:10CE6B007C022DA6008B10A7008560260C148D016B
:10CE7B00CC0001F3023CFD023C397C022D7C023BD1
:10CE8B0026037C023AED00148D017C022D398403BC
:10CE9B00CE001E0213A00C2A13A00854B60233F1C5
:10CEAB0002322712 8004850C26127D02322B03BD21
:10CEBB00C9BCF70232398B04850C2052B70233867A
:10CECB00FF39B60233F102302712804085C026ECC1
:10CEDB007D02302B03BDC9BCF70230398B4085C0B6
:10CEEB00202C8403CE001E0213A00CB013A008D27A
:10CEFB00B60233F10231271280108 53026BE7D0237
:10CF0B00312B03BDC9BCF70231398B108530275C3F
:10CF1B00B7023381FC2555148D017F02388601F64B
:10CF2B00023148790238C00324F8B70239CB04FB2D
:10CF3B000230FB0230FB0230B602324C3DFD0234B4
:10CF4B0005C30240FD0236FC0234B30238C30002B3
:10CF5B00FD023E3CCE0240CC00001E008003C3000D
:10CF6B00010808BC023625F238FD023A8601391257
:10CF7B009F01F9DC9E830106547ECEA7CC3F3FCDAB
:10CF8B00A300260C18091809188C010122F1313164
:10CF9B003918EC00585804048403CE001E028F3954
:10CFAB00FC022E2A05CC200020071A939224028A19
:10CFBB0010DDB5158D01398A108F8D1C8F830010F4
:10CFCB002005DCAFC300108FEC01A3111A93B12520
:10CFDB00061A93B325060D39EC01A311DD98DFAFCB
:10CFEB0004D398DD9A04040404D398DDB3DC9805CC
:10CFFB0093B3DDB139CC3F3F18ED0218ED04CC00F3
:10D00B00008D09251C93981A93B124151808180 83C
```

-45-

```
:10D01B00E301A3058FC300048F1A93B125F21A9372
:10D02B00B339CC3F3F18ED0218ED04CC00008D094D
:10D03B0025EF93981A93B124E8180818088F8300EA
:10D04B00048FE311A3151A93B125F220D1050554D2
:10D05B0054812024028B40C1202402CB4018ED02C6
:10D06B00C602183A8430398DE427128120270581B6
:10D07B0030261339D6B7260E7A00B82009D6B7C199
:10D08B002026037C00B897B739EC01A3058D30D768
:10D09B00A1EC03A3078D28D7A2EC05A3098D20D7FC
:10D0AB00A3EC07A30B8D18D7A4EC09A30D8D10D7F8
:10D0BB00A5EC0BA30F8D08D7A6EC0DA3112052DD09
:10D0CB009F05050505D39F939A250D149EFF7C00A4
:10D0DB009E939824F9D69E39313186FE39EC0DA3F7
:10D0EB00118DDCD7A1EC0BA30F8DD4D7A2EC09A328
:10D0FB000D8DCCD7A3EC07A30B8DC4D7A4EC05A344
:10D10B00098DBCD7A5EC03A3078DB4D7A6EC01A35F
:10D11B00058DACD7A7DBA1DBA3DBA5C10926BB968D
:10D12B00A2D6A40505059BA3DBA5585805DBA6DDF8
:10D13B009CC609DBA1D0A2DBA5D0A6C00924FCCBE1
:10D14B0009D7A8270BC1032707C106270386FF3979
:10D15B00CED1AA3AEE00DFADCC0200DDA9CC0000A7
:10D16B00D3A91A8303A02210DDAB05D3AD8FEC003E
:10D17B00939C271ADCAB250293A97400A97600AA0D
:10D18B0024DEDDAB26C7DEADEC00939C26BFDCAB0B
:10D19B0013A80F0AC3040012A80303C3040039D158
:10D1AB00B200D8F400E036000200030004000B00CC
:10D1BB000C000D00130014001C00240025002D0092
:10D1CB004A004B004C005300540055005B005C00C0
:10D1DB0064009200930094009B009C009D00A400AF
:10D1EB00A500DB00DC00E400E5012401680242023B
:10D1FB00430244024A024B024C02530254025B02AA
:10D20B005C025D02640265026D028A028B028C0273
:10D21B009202930294029B029C029D02A402A5021D
:10D22B00D202D302D402DB02DC02E402E5031B03CD
:10D23B001C0324032D048104820483048A048B04BD
:10D24B008C049204930494049B049C04A404AD04E6
:10D25B00C904CA04CB04D204D304D404DB04DC0415
:10D26B00E404ED05120513051B051C0524055B06DF
:10D27B00C106C206C306C906CA06CB06D206D3062A
:10D28B00D406DB06DC06E406E50709070A070B07ED
:10D29B00120713071B071C0724072D0753076409E5
:10D2AB00000090109020909090A090B0912091309E5
:10D2BB001B091C0924094909520950B400B420B42
:10D2CB004A0B530B64100210031004100A100B10BE
:10D2DB000C101310141015101B101C1024104A10D6
:10D2EB004B104C105210531054105B105C10641008
:10D2FB006D109210931094109B109C10A410AD10F5
:10D30B00DB10DC10E411241201120212031203120A12B8
:10D31B000B120C121212131214121B121C121D12CE
:10D32B0024122512411242124312491241241249
:10D33B004C125212531254125A125B125C125D129F
:10D34B00631264126C1289128A128B12911292124E
:10D35B00931294129A129B129C12A312A412AC1247
:10D36B00D212D312DA12DB12DC12E312E412EC1338
```

```
:10D37B001B13231324132C14411442144314491468
:10D38B004A144B145214531454145B145C14641449
:10D39B006D1481148214831489148A148B149114C0
:10D3AB009214931494149A149B149C14A314A41401
:10D3BB00A514AD14C914CA14CB14D114D214D3149C
:10D3CB00DA14DB14DC14E314E414ED151215131545
:10D3DB001A151B15231524152C156316801681168B
:10D3EB00821689168A168B16921693169B169C1606
:10D3FB00A416AD16C016C116C216C816C916CA1683
:10D40B00CB16D116D216D316DA16DB16DC16E316AC
:10D41B00E416EC1709170A171117121713171A1717
:10D42B001B17231724172C175A176318C018C1186A
:10D43B00C218C918CA18D218D318DB18E419001966
:10D44B0001190219081909190A19111912191319B5
:10D45B001A191B19231924194919511954195A19631B24
:10D46B00011B0A1B1B1B411B491B511B5A1B632016
:10D47B000120022003200A200B2012201320142040
:10D48B001B201C2024202D2049204A204B205220D9
:10D49B00532054205B205C2064206D20922093202D
:10D4AB009B209C20A420DB20E4220122022203229C9
:10D4BB0009220A220B221222132214221B221C22C3
:10D4CB0024222522241224222432249224A224B2254
:10D4DB00512252225322542225A225B225C22632273
:10D4EB0064226C2289228A228B22912292229322FD
:10D4FB009A229B229C22A322A422AC22D222D322A8
:10D50B00DA22DB22E322E4231B2323240024012430D
:10D51B00022240924052430A240B24122413241B241C2464
:10D52B0024244024412442244824492244A244B24C3
:10D53B00512452245324552456245B245C2463246424F2
:10D54B006D2480248124822488248924822488249A
:10D55B0090249124922493249924942492498249C24F0
:10D56B00A224A324A424AB24AD24C924CA24D124EB
:10D57B00D224D324D924DA24DB24E224E324E424A4
:10D58B00EC2512251A251B2522252326402641266C
:10D59B00422649264A26522653265B266426802697
:10D5AB0081268226882689268A26912692269326EC
:10D5BB009A269B26A326A426AC26C026C126C226C5
:10D5CB00C826C926CA26D026D126D226D326D926A6
:10D5DB00DA26DB26E226E326E426EC2709270A27B0
:10D5EB001127122719271A271B27222723275227F0
:10D5FB0062288028812889288A2892289B28C0287D
:10D60B00C128C828C928CA28D128D228DA28DB285B
:10D61B00E32900290129082909290A291029112997
:10D62B00122919291A291B29222923292B29512986
:10D63B005929622AC12AD22B012B092B122B402BE1
:10D64B00482B502B522B5A30013009300A301230F4
:10D65B00133014301B301C302430253049304A3005
:10D66B004B30523053305B305C3064306D30923025
:10D67B0093309B30A430DB32003201320232093250C
:10D68B000A32123213321B321C32243240324132F4
:10D69B004232483249324A324B325132523253329I
:10D6AB005A325B325C32633264326D3289328A3287
:10D6BB009132923293329A329B32A332A432D232CB
:10D6CB00DA32DB32E3340034013402340934043405
```

```
:10D6DB00123413341B34243440344134483449 3429
:10D6EB004A3451345234533 45A345B3463346 434D3
:10D6FB006C34803481348834 89348A3490349 13456
:10D70B009234933499349A349B34A234A334A4 3492
:10D71B00AC34C934CA34D134D234D934DA34DB 34EE
:10D72B00E234E3351235 1A35223 600360 13609 3 626
:10D73B000A3612361B36403641364836493 64A369B
:10D74B00513652365A365B3663368 0368 136 88 36DA
:10D75B008 9368A369 03 69136923699369A369 B367A
:10D76B00A236A336AB36C036C136C836C936CA 3632
:10D77B00D036D136D236D836D936DA36DB36E1 3634
:10D78B00E236E336EA37093711371237193 71A37CA
:10D79B00213722372A384038 41384938 523 880 3 8B7
:10D7AB0081388388938913892389A38C038C138DE
:10D7BB00C838C938D038D138D238D938DA38E2 3904
:10D7CB0000039013908390939103911391239183929
:10D7DB0019391A39213922392A3951396 13A893A99
:10D7EB00C83AD13B083B103B193B483B503B583B9D
:10D7FB0061400049400A4012401B402440494010
:10D80B0052405B4064409 2409B420042 0 9420A42B4
:10D81B00124213421B42244240424142484249 4277
:10D82B004425142 524 25A4 25B42634 26 4426C4208
:10D83B0089428A42914292429A429B42A342D242ED
:10D84B00DA440044094412441B44404448444944CC
:10D85B004A44514452445A445B4463448044884490
:10D86B0089448A44904491449 24499449A449B44F9
:10D87B00A244A344C944D144D244D944DA44E24635
:10D88B000046094612464046484649465146 5246CE
:10D89B005A468046814688468946904691469 2462E
:10D8AB0099469A46A246C046C146C846C9 46D04686
:10D8BB00D146D246D846D946DA46E146E2 47094731
:10D8CB001147194721480048094 8404848 484948EA
:10D8DB00514880488848894890489148994 8C048A1
:10D8EB00C848C948D048D148D800010002000900F7
:10D8FB000A000B00120013 0014001B001C00240074
:10D90B00250 02D0049004A004B0051005 200 5300E6
:10D91B005A005B005C006300 64006C006D0 0 7500D6
:10D92B009100 9200930099009A009B00A200A30023
:10D93B00A400AB00AC00B400B500BD00D900DA0008
:10D94B00DB00E100E200E300EA00EB00EC00F30097
:10D95B00F400FC00FD012101220123012A012B010E
:10D96B00330134013C016A016B0173017C024002FB
:10D97B004102420249024A024B02520253025B022B
:10D98B005C0264026D02880289028A029102920291
:10D99B0093029A029B02A302A402AC02B502D0022C
:10D9AB00D102D202D902DA02DB02E202E302EB027B
:10D9BB00EC02F402FD03180319031A0321032203DB
:10D9CB0023032A032B03330334033C036103620356
:10D9DB006A036B0373037C03AA03B30480048104FF
:10D9EB0082048 9048A04920493049B04A404C8044B
:10D9FB00C904CA04D104D204DA04DB04E304EC0541
:10DA0B001005110512051905 1A052205 23052B050D
:10DA1B003405580559055A0561056205 6A056B05FC
:10DA2B0073057C05A105A205AA05B305EA06C00688
```

```
:10DA3B00C106C906CA06D206DB0708070907110784
:10DA4B0012071A0723075007510759075A0762078E
:10DA5B006B0798079907A107A207AA07B307E10766
:10DA6B00EA09000901090909120948094909510978
:10DA7B005A09900991099909A209D809D909E1090B
:10DA8B00EA0B400B490B880B910BD00BD9100010F4
:10DA9B0001100210091000A100B10121013101B109A
:10DAAB001C1024102D10481049104A105110521000
:10DABB0053105A105B10631064106C10751090109B
:10DACB009110921099109A109B10A210A310AB10EA
:10DADB00AC10B410BD10D810D910DA10E110E21050
:10DAEB00E310EA10EB10F310F410FC1121112211CA
:10DAFB002A112B1133113C116A11731200120112EE
:10DB0B00051209120A120E121212131217121B12FD
:10DB1B0024124012411242124812491 24A12511257
:10DB2B00521253125A125B12631264126C12881245
:10DB3B0089128A12901291129212991 29A129B12B6
:10DB4B00A212A312AB12AC12B412D012D112D21277
:10DB5B00D812D912DA12E112E212E312EA12EB1224
:10DB6B00F312F412FC13181319131A13201321 13A5
:10DB7B00221329132A132B13321333133B133C1386
:10DB8B0061136213691 36A13721373137B13AA1451
:10DB9B0040144114451449144A144E14521457148A
:10DBAB005B1480148114881489148A1491149214B0
:10DBBB009A149B14A314C814C914D014D114D214DE
:10DBCB00D914DA14E214E314EB1510151115181 50A
:10DBDB0019151A15211522152A152B15331558153C
:10DBEB00591560156115621569156A15721573154E
:10DBFB007B15A115A915AA15B216801681168516C7
:10DC0B0089168E169216C016C116C816C916D116CD
:10DC1B00D216DA17081709171017111719171A1731
:10DC2B0022175017511758175917611762176A1790
:10DC3B0098179917A017A117A917AA17B217E117C9
:10DC4B00E918C018C518C91900190819091911 19AB
:10DC5B0048195019511959199019981999 19A1194D
:10DC6B00D819E019E119E91B001B401B481B881B45
:10DC7B00901BD01BD82000200120022009200A2055
:10DC8B00122013201B202420482049204A205120F9
:10DC9B005220 5A205B2063206C20902091209220F0
:10DCAB0099209A20A220A320AB20B420D820D920E1
:10DCBB00DA20E120E220EA20EB20F320FC21212D5
:10DCCB0022212A2133216A22002201220522092244
:10DCDB000A220E22122217221B22402241 22482204
:10DCEB0049224A22512252225A225B226322882243
:10DCFB0089229022912292229922 9A22A222A32255
:10DD0B00AB22D022D122D822D922DA22E122E2225E
:10DD1B00EA22EB22F32318231923202321 23222386
:10DD2B0029232A23322333233B23612369236A23A9
:10DD3B00722400240424052409240D240E24122407
:10DD4B0016241F2440244124452448244924 4D24CF
:10DD5B004E24512452245624 5A2480248124882 46E
:10DD6B0089249024912492249924 9A24A224C824AF
:10DD7B00C924D024D124D824D924DA24E124E224C0
:10DD8B00EA2510251125182519252025212522 25C1
```

-49-

```
:10DD9B0029252A25322558255925602561256825F1
:10DDAB0069256A25712572257A25A125A926402684
:10DDBB0044264526492642D26562680268526882626
:10DDCB0089268D269126C026C826C926D026D1267F
:10DDDB00D9270827102711271827192721275027SC
:10DDEB005827592760276127692798827A027A1273C
:10DDFB00A827A927B128802884288D28C028C829BE
:10DE0B0000290829102948295029582990299829BF
:10DE1B00A029D829E029E82AC430003001300930B4
:10DE2B000A3012301B304830493051305230530A2
:10DE3B006330903091309930A30A230AB30D83079
:10DE4B00D930E130E230EA30F33121312A3200327D
:10DE5B000132053209320E3212324032413248322F
:10DE6B004932513252325A328832893290329132B9F
:10DE7B0099329A32A232D032D132D832D932E132FF
:10DE8B00E232EA3318331933203321332933323A335F
:10DE9B0032336133693400340434053409340D34BE
:10DEAB001634403444534483449344D345134803476
:10DEBB008834893490349134993443483
:10DECB00D834D934E13510351835193520352135BD
:10DEDB0029355835603561356835693571360336006
:10DEEB0004360C360D3615361E36403644364836SB
:10DEFB004C364D3655368036883690306C036C83659
:10DF0B00D36D83708371371837203750375837AF
:10DF1B00603768379837A037A838433844384C38BF
:10DF2B00553884388C3A833A8C3CC34000400940C6
:10DF3B00124048404940514054040904091409940CE
:10DF4B00A240D840D940E140EA412142004205427B
:10DF5B0009424042484249425142884290429142D2
:10DF6B009942D042D842D942E14318432043214333E
:10DF7B00294400440444044440D44404484480448844AC
:10DF8B009044C844D044D8451045184520455845CC1
:10DF9B006045684603460460C46154644464C48C5
:10DFAB000024803480B480C48148ID4843484B484B
:10DFBB004C48544A424A434A4B4A544A834A8B4C34
:10DFCB00824C8B4EC25048505150905099950D85063
:10DFDB00E152485288529052D052D8531853205481
:10DFEB00045603560C58025803580B5814584358F0
:10DFFB004B5A015A025A0A5A0B5A135A1C5A425A72
:10E00B004A5A4B5A535C415C425C4A5C535C825C9F
:10E01B008A5E815E8A66036802680B6A016A026A1D
:10E02B0000A6A136A426A4A6C416C4A000400050092
:10E03B000C000D000E001500160017001E001F002F
:10E04B00270048004C004D0051005500560005A0067
:10E05B005E005F0063006700900091009500990000DF
:10E06B009A009E00A200A700AB00D800D900E100E7
:10E07B000E200EA00F301200121012901A20132010A
:10E08B003B016801690171017201A02430244028A
:10E09B0045024C024D024E025502560225E025F02D1
:10E0AB00670288028C028D029102950296029A02F7
:10E0BB009E02A702D002D102D502D902DE02E203F0
:10E0CB001803190321032A036003610369037203I5
:10E0DB00A803A903B103BA04830484048504440
:10E0EB008D04950496049E04A704C804CC04CD04A7
```

-50-

```
:10E0FB00D104D504DE0510051505190558056105 74
:10E10B00A005A905E805F106C306C406CC06CD0695
:10E11B00D506DE0708070C07150750079807E00917
:10E12B00030904090C0915094C0B430B4C10031084
:10E13B00041005100C100D100E10151016101E10DB
:10E14B001F10271048104C104D1051105510561021
:10E15B005A105E1067109010911095109910 9E1028
:10E16B00A210D810D910E110EA1120112111291198
:10E17B0032116811691171117A120312041205120E
:10E18B000B120C120D1214121512161 21D121E1256
:10E19B00261227122F124312441245124B124C1205
:10E1AB004D125412551256125D125E126612671200
:10E1BB006F1288128C128D1290129112941295126A
:10E1CB0099129D129E12A612D012D512D812D912E4
:10E1DB00DD12E11318132013211329136013681395
:10E1EB0069137113A813B114421443144 4 14B1440
:10E1FB004C144D14541455145D145E146 6146F14A2
:10E20B00831484148B148C148D14941495149D14F2
:10E21B009E14A614C814CC14D014D414D514DD1524
:10E22B0010151815581560 15A015A815E8168216A7
:10E23B00831684168B168C16941695169D16A61699
:10E24B00C316C416CB16CC16D416D516DD170C1761
:10E25B001418C218C318CB18CC18D418DD1903190D
:10E26B000B190C19141B021B031B0B1B141B431B3D
:10E27B004B1D421D4B200320042005200C200D209C
:10E28B00152016201E20272048204C204D205120E1
:10E29B0055205E20902095209920D820E121202127
:10E2AB0029216821712202220322042 20B220C2233
:10E2BB000D22142215221D221E2226222F2243223A
:10E2CB0044224B224C224D22542255225D225E22A7
:10E2DB00662288228C229022942295229D22D02283
:10E2EB00D8231823202360236823A82402240 32483
:10E2FB0004240A240B240C2413241424152 41C2476
:10E30B001D24252426242E244224443244424 4A2439
:10E31B004B244C245324542455245C245D24652421
:10E32B0066246E24832484248B248C2493249424A9
:10E33B0095249C249D24A524CC24D424DC2641267E
:10E34B00422643264A264B264C26532654265C2629
:10E35B005D2665266E26822683268A268B268C26AC
:10E36B00932694269C269D26A526C326CB26CC2613
:10E37B00D326D426DC288128822883288A288B2838
:10E38B00932894289C28A528C228C328CA28CB28C0
:10E39B00D328D428DC2903290B29132AC12AC22A02
:10E3AB00CA2ACB2AD32ADC2B022B0A2B0B2B132D9D
:10E3BB0012D022D0A2D132D422D4A2F412F4A30AC
:10E3CB0033004300C300D3015301E304C305530CE
:10E3DB009030D831203168320232033204320B32A2
:10E3EB000C32143215321D32263243324432 4B3248
:10E3FB004C32543255325D328C3294340134023407
:10E40B0003340A340B340C34133414341C341D34DD
:10E41B0025342E34423443344A344B344C34533445
:10E42B0054345C345D34653483348B348C349334A2
:10E43B0094349C36013602360336093 60A360B36CF
:10E44B001236133614361B361C36243625362D362B
```

```
:10E45B004136423643364936 4A364B3652365336B8
:10E46B0054365B365C36 6 643 665366D3682368336AB
:10E47B008A368B3692369336 94369B369C36A43638
:10E48B00C336CB36D336DB38 40384138423849387F
:10E49B004A384B38523 8 53385B385C3864386D38EF
:10E4AB008138823889388A388B38923893389B3840
:10E4BB009C38A438C238CA38CB38D238D338DB3A78
:10E4CB00803A813A823A893A8A3A923A933A9B3A1B
:10E4DB00A43AC13AC23AC93ACA3AD23AD33ADB3B26
:10E4EB00023B0A3B123CC03CC13CC93CCA3CD23C3F
:10E4FB00DB3D013D093D0A3D123F003F013F093F16
:10E50B00123F413F4940034004400C4015404C42F0
:10E51B00024203420B420C4214421D4243424B4205
:10E52B004C425440014402440344 0A440B441344F4
:10E53B0014441C442544424443444A444B445344EE
:10E54B0054445C4483448B44934600460146024644
:10E55B0009460A460B46124613461B461C462446E2
:10E56B002D46414642464946 4A464B46524653463D
:10E57B005B465C46644682468A468B469246693468 9
:10E58B009B480048014802480948 0A4812481348 6A
:10E59B001B48244484048414824848 4849484A4853
:10E5AB005148524853485A485B48634864486C4842
:10E5BB008148824889488A489148924893489A48AA
:10E5CB009B48A348C248CA48D248DA4A404A414A03
:10E5DB00494A4A4A524A5B4A804A814A884A894A8E
:10E5EB008A4A914A924A9A4A4A9B4AA34AC14AC94AC1
:10E5FB00CA4AD14AD24ADA4C804C814C894C924C53
:10E60B00C04CC14CC84CC94CD14CD24CDA4D014D0D
:10E61B00094D114EC04EC94F004F084F094F1150B5
:10E62B0003500C52025203520B52145243524B548E
:10E63B00015402540A540B5413541C5442544A545C
:10E64B004B54535600560156025609560A5612564B
:10E65B0013561B56245641564256 4956 4A56525645
:10E66B0053565B5682568A56925800580158095891
:10E67B000A5812581B5840584158485849584A583C
:10E68B00515852585A585B5863588158895 88A5870
:10E69B00915892589A5A005A015A095A125A405A8A
:10E6AB00415A485A495A515A525A5A5A805A815ABF
:10E6BB00885A895A905A915A925A995A9A5AA25AE6
:10E6CB00C15AC95AD15AD95C405C495C805C885CA0
:10E6DB00895C915CC05CC85CC95CD05CD15CD95E68
:10E6EB00805EC05EC85F005F085F106202620B64F1
:10E6FB00016402640A64136442644A66006601663C
:10E70B0009660A6612661B66416649664A66526866
:10E71B00006801680968126840684168486849 6880
:10E72B00516852685A6881688968916A006A096AF7
:10E73B00406A486A496A516A806A886A896A906A3B
:10E74B00916A996C406C806C886CC06CC86CD0748E
:10E75B0001740A76007601760976127641764978 4D
:10E76B00007809784078487849 78517A00B60233B6
:10E77B008501273584FEB70233BDE7C8BDE8772591
:10E78B0010DEA8FF1FFCBDE8F92506DEA8FF1FFE63
:10E79B0039FC023404040404C30001F3023EFD02FD
:10E7AB003EB302342303BDC9BC0D39DEA88C140063
```

-52-

```
     :10E7BB002708BDEA872703BDEAED7EEC32FC023465
     :10E7CB00CE0240BDE7FBCC0C00DDB8F30238F30200
     :10E7DB0038DDBADCB81A93BA2715830BFEBDE834C3
     :10E7EB00C3EF308FEC00DEB8ED00C6023ADFB8396C
  5  :10E7FB0005C3143EDD9E18CE1440189C9E271AECC0
     :10E80B00002B028407C3EF308FEE008F18ED00C68C
     :10E81B00023A183A189C9E25E6EC0084872A03CC12
     :10E82B00000083074218ED0039DDA2CCF8C0DDA44F
     :10E83B00DE9EEC008C1440272FDDA6DCA4D3A22B8C
 10  :10E84B0003830740DDA40909E30029152B03830784
     :10E85B0040C3FDB28FEE008FD3A62B03830742DD9F
     :10E86B00A68C144026D5DCA6C3074239CE1000185F
     :10E87B00CE0000C6021AEF003A8C14025F71AEFEF
     :10E88B0002183A1AEF00DFA8FE0236CC55AA973AC7
 15  :10E89B00D73A0909A6002A4EDFB4BDE7DE274DDCC7
     :10E8AB00B483024004B3023443530583074 0DDA213
     :10E8BB00DEA80909DFA8EC022722C3EF308FEE0098
     :10E8CB008FD3A22B03830740C3FDB28FEE008F4083
     :10E8DB00508200E3002A03C30742ED00C6023A8CC4
 20  :10E8EB00140025D2DEB48C024022A0390D39DCA8ED
     :10E8FB00C30BBEDDAADEA818DEAAEC0018ED00C61D
     :10E90B00023A183A8C140023F1CC0000FD1FC0CC46
     :10E91B00140093A804DDACDDB0C30001DDAED3B0B1
     :10E92B00DDB27F0098CC55AA973AD73ACCF8BEDD2A
 25  :10E93B00A6CE1400CC140093AC93ACDDB6CC0BFE7E
     :10E94B00D3AED3AE188FEC002724C3EF308FEE007D
     :10E95B008F83074018E30029152B03830740C3FD62
     :10E96B00B28FEE008FD3A62B03830742DDA60909D6
     :10E97B00180918099CB624CEDCA6C3074226037ED1
 30  :10E98B00EA457F0098C3EF308FEC00DDA2DEAA09C9
     :10E99B0009DCAA830BC0DDA8188FDCAC051A93B277
     :10E9AB00245DDCB293ACDDACEC02271CC3EF308FE3
     :10E9BB00EE008F830740D3A22B03830740C3FDB226
     :10E9CB008FEE008F4050820018E3002A03C30742EA
 35  :10E9DB00DDB418EC002715C3EF308FEE008F93A238
     :10E9EB002B03830740C3FDB28FEE008FED00DCB429
     :10E9FB0018ED008C1FBE2469C6023A183A20A9DF15
     :10EA0B00AAEC02ED00271CC3EF308FEE008F8307BB
     :10EA1B0040D3A22B03830740C3FDB28FEE008F4080
 40  :10EA2B0050820018E3002A03C3074218ED008C1F25
     :10EA3B00BE242EC6023A183A20C7DCAC051A93B294
     :10EA4B0025041398FF077C00981298032BDEAA0964
     :10EA5B0009DFAAEC02ED008C1FBE2405C6023A208A
     :10EA6B00F2BDE7DE270EDCAEC30001DDAED3B0DDB9
 45  :10EA7B00B27EE9301398FE020C390D39DEA8EC009A
     :10EA8B0026060808DFA820F6CC140293A804BDE7DD
     :10EA9B00FBCC03A1B3023805DDB618CE1BC0CC03EB
     :10EAAB00A1B3023405DDA0830740F30234F3023433
     :10EABB00C3023E8FA6002B07DCA0BDE8342609DC81
 50  :10EACB00A018ED00C602183ACC55AA973AD73ADCF3
     :10EADB00A0C300021A93B626CC181C0080188C1BFE
     :10EAEB00C039DEA818CE1440DFB418DF9ECC55AA6F
     :10EAFB00973AD73A18CE0BFEEC00830742DDA6C639
     :10EB0B00023A183AEC002720C3EF308FEE008F83C8
```

-53-

```
     :10EB1B00074018E3002805CC0000200C2B038307CB
     :10EB2B0040C3FDB28FEE008FD3A62B038307428C1D
     :10EB3B00140025C9C3F6728FEC0018DE9E18ED0089
     :10EB4B00DEB4C6023A183A8C1400259CEC008307FD
  5  :10EB5B004218ED0018DF9EDEA8CC55AA973AD73A9B
     :10EB6B00EC00C3EF308FEE008F2B1A830740ED00C4
     :10EB7B00DFB4CC140093B4C3EF308FEE008FE300FF
     :10EB8B002503C30740ED00C6023A8C140025CACEFC
     :10EB9B001BC0DFB4CC55AA973AD73AEC00BDE8348A
 10  :10EBAB002755C3EF308FEC00DD9CCCF8C0DDA4CC37
     :10EBBB00F8BEDDA6CE1400DCA4D3A22B0383074042
     :10EBCB00DDA40909E30029152B03830740C3FDB21C
     :10EBDB008FEE008FD3A62B03830742DDA69CA826BE
     :10EBEB00D6DCA6C3F6728FDC9CA3002B03830740F5
 15  :10EBFB00C3FDB28FEE008F8FDCA2F30234F302342D
     :10EC0B00C3FAFE8F1F008003C30002E300840F1AB8
     :10EC1B008307422503830742ED00DEB41E02800604
     :10EC2B00C6023A7EEB9D399FA8CE0C00DF90FC020A
     :10EC3B0034B3023805C30240DDB618CE0242149E2F
 20  :10EC4B008020028D11BDECD5C11B25F7270FC11CF0
     :10EC5B0027328D5620EFCEEEC020218D1C8D6BC13F
     :10EC6B001B25F8260C8D63C11B24048DE920EE2790
     :10EC7B00ECC11C270F8D3320E4CEEEDB3AA6007ED1
     :10EC8B00EE918D168D44C11925F82715C11B25F260
 25  :10EC9B0027CBC11C27AF8D1220EACEEEF620DD8DDF
     :10ECAB00238D27C11D25F87EEC50139E800B18EC8D
     :10ECBB000084071A83070824108D0FC11D25053109
     :10ECCB00317EEC50CEEF1120B339D69E2B06149E1D
     :10ECDB0080398D408D1A290A24F8CE001E02D79E4A
 30  :10ECEB008F399EA8DE90CC4C30DD8286727E924AA4
     :10ECFB00189CB6241418EC002A03CC000018081832
     :10ED0B00080484031A83038439CC80000B398DE00B
     :10ED1B0029D025FA260B9EA87EEC498DD3177EEEC3
     :10ED2B00911A83039127F49EA81A83038625082773B
 35  :10ED3B00561A83039C26D7D79FCE1BC08DB229189A
     :10ED4B002416ED0008088C1BCC25F18D5CFC1BCA2E
     :10ED5B00FD1BC0CE1BC220E48C1BC0271FDDA08C6B
     :10ED6B001BCA2504129F9C1BFF0236CE1BC0A6019B
     :10ED7B00BDEE910808BC023625F4DCA01A8303848F
 40  :10ED8B007EED1B8D2420F3CE1BC0BDECFB290F2485
     :10ED9B0000DED0008088C1BDE25F08D7520E9DDA03C
     :10EDAB008C1BC027D58D6A20D1CE1C10CC55AA97B1
     :10EDBB003AD73ACC0000ED0008088C1C1C25F7CE86
     :10EDCB001BC0DFAAEC00CE001E02DDA28F8D1DDC66
 45  :10EDDB00A28D19DEAA08088C1BCA25E6CE1C10A62C
     :10EDEB0001BDEE9108088C1C1C25F439DDA4CE1C4A
     :10EDFB001C0909EC0005E30005E30005E30005D35E
     :10EE0B00A43CCE010002DFA438ED008C1C1022E1E3
     :10EE1B0039FF0236CE1C10CC55AA973AD73ACC0004
 50  :10EE2B0000ED0008088C1C2E25F7CE1BC0DFAAECCA
     :10EE3B0000CE001E02DDA28F8D56DCA28D52DEAA03
     :10EE4B000808BC023625E67F00ACCE1C10CC2F2F59
     :10EE5B00DDA6EC007C00A683006424F8CB647C0068
     :10EE6B00A7C00A24F9CB3A96A68D0F96A78D0B1740
```

-54-

```
:10EE7B008D0808088C1C2E25D43912AC80088131E2
:10EE8B00260314AC80393CDE90A70008DF9038399C
:10EE9B00DDA4CE1C2E0909EC0005E30005E30005FB
:10EEAB00E30005D3A43CCE03E802DFA438ED008CCD
:10EEBB001C1022E139414243444546474B494A4BDD
:10EECB004C4D4E4F50515253545556575B595A203A
:10EEDB0061626364656667686960A6B6C6D6E6F709F
:10EEEB00717273747576777B797A20303132333466
:10EEFB003536373839260D092C3A232D2E242F2B56
:10EF0B00252A3D5E20203B3C3E405B5C5D5F607E86
:10EF1B00210D092C3A0A2D2E242F227C2A28293F39
:10EF2B007B7D27800008000000006540002056806E8
:10EF3B00D8065603F2047C000405EC011C056A0696
:10EF4B00B2030606DA039005A2065805B0050003C6
:10EF5B00F4003006D0047E067005C60006021A00C7
:10EF6B00FC05EE015202A4011E04B6038A056C02D5
:10EF7B009804C406B404140376030080572068406C9
:10EF8B00DC05E4035C039200A4058405A404DA0009
:10EF9B0018065A00B4012E05B20010034A050207E9
:10EFAB000C006603F601B8064A0032043E03CA069B
:10EFBB00D2029E03440480058E01AC067203D80571
:10EFCB000E05C8004603280008028A0614021C0519
:10EFDB003A048600FE0598046805F0036404F80102
:10EFEB0054027005480 2A604CA06F80120049801D1
:10EFFB005C04B802B003EE038C066C04B2056E041D
:10F00B000D60708029A0042059404C60668066406F1
:10F01B00B6025E02540416023806200037806BA06BE
:10F02B0008030A03C200CC0574055E0518068602A8
:10F03B0062035206DE02DE01FC05E6029201B20318
:10F04B005E0258008E0394009404A200A600C00038
:10F05B00D40586041A02EC05A6042200EA04DC009F
:10F06B005C069A001A023C0382065C018E019E002C
:10F07B00B6052806780130062404 4E05B4039A051C
:10F08B00C00012032204AC034C037C017E05040177
:10F09B00460278070E040C0230006806BE0184039A
:10F0AB00F8045C062E01BA05D403DE064C060C01EF
:10F0BB00960034009A03AC0440007004EE03CC03BA
:10F0CB000E01C406D4030206CC02A0037205800312
:10F0DB004603C6050A0482054403EA0590061C058F
:10F0EB001401AE00D00696067404A8022C03DA04B1
:10F0FB00EA057C0510057801DA05CA02F4017200F5
:10F10B0048016801DE032A0562014C000A05340040
:10F11B003C028C052205CE0616051C010A021E00B8
:10F12B00AC02D6053C072002F80488068A0472015B
:10F13B0000042C0550059A06F00176046A0266025B
:10F14B007E05F202C201F203660110004C04FA03C1
:10F15B005601A6015600C600E4027206C6016C05F4
:10F16B004A06E2002802A8040406E804CC03B60110
:10F17B00E206FA02E20714012207280642049A0269
:10F18B0024032E015E020006A404BA00DA03360241
:10F19B00B2073E056603F005EA06B0038E05AE0026
:10F1AB002E066E0218015004B40296041205700567
:10F1BB00E200A204D800B2000E070A01B6043C021A
:10F1CB009C058C03D6004402880538059603620221
```

-55-

```
:10F1DB006E04C8049602AE066A04D40040066602AA
:10F1EB005C023606B803C0055C026002DC029002CA
:10F1FB0056009200BE04180420005A023A018C05F6
:10F20B0026062203980320037A0144040A06BC0451
:10F21B005A05D2060A0098006E030C030003700314
:10F22B00C40542061A00CE04A604E8057602F201D4
:10F23B006605600532052005lA00AA071E0688041C
:10F24B002A06EE026402C0010E035400C406C40673
:10F25B00E0040203B402E00726022201FE00D807F5
:10F26B003C05E805AC0216029405E000B001B405BC
:10F27B008A02860360049404D2025A03BE02DA00A7
:10F28B0090041E018A039601420458009602FE0563
:10F29B004004A402F0053000A8042802BE00C204FA
:10F2AB0000072400D605AA05DE0588049203BC04DA
:10F2BB001C014002FC02EE042603FE05A80490018B
:10F2CB003E0424048E048C00EC00EE008404DE006B
:10F2DB00F00208005E0086068E069C04E0007C00AF
:10F2EB001C00F201E8023E020A047603840060046B
:10F2FB0062065E008804480190069001040lA00696
:10F30B009E043600B804E20736052A007E04300658
:10F31B007A001E05FA013200F40700062601EA0501
:10F32B005404500240063405B6020C0248039C04F8
:10F33B0078059E05C2038606800014006203400315
:10F34B0024046406F404AE06600604034E008A022D
:10F35B00E8037E044A017A0180019201C00506068A
:10F36B009201D601480106046E027A01A20024071D
:10F37B001006A006AC040E0438026A023200BA036F
:10F38B001C006A04E4071A06C007380282018605CE
:10F39B002C05DA03FA00800078045E043205F606C9
:10F3AB0030067C060001BC0020031805D605FC02C4
:10F3BB00C603E0013402CA064E00F60128060E070A
:10F3CB000201F60198062803E4003601EC063C0026
:10F3DB009C0556036A03AE04520138044202420lF3
:10F3EB00D000720636011404F005B802CE03CE022B
:10F3FB000E072E0310024A005001C6039E0652064A
:10F40B00D6047A011A030405A004FE06CE05C40037
:10F41B00FA02A2038804C203740682035A0582000F
:10F42B0016012C03480064064803C8034201AA05D1
:10F43B000C032606120484046604F6054606F60140
:10F44B005A03EC04B007060592066202520061E062A
:10F45B000600CA0516035001FA01B0008C04A00087
:10F46B00D202EA00E806980380019C0676044C055C
:10F47B00BE04AA017C0276022E0182062C03DC015B
:10F48B009403AA04EC01C206CA057E050803E8052D
:10F49B00120694022A057A01D8017001DC014A0098
:10F4AB003A05CC010802D402F60470054E01740231
:10F4BB007C01F0004A01A400E2016A002606E60185
:10F4CB00E007120640032C06A20334056406AE00C7
:10F4DB002C014E041000A0000C043A03D405360294
:10F4EB006C02AC003E0234055A028E00BC0058057B
:10F4FB0024031E040805D0006C036E061804E601F5
:10F50B0064051E071C06EC010C06C203B2022007A1
:10F51B003A021400AE028404D002D80188045605C6
:10F52B003E052E02BC072205DC03BA02FA03FC01DE
```

```
:10F53B003C048A00820206068C007A01E6047404FD
:10F54B006004460102043407340042E05F806FE0558
:10F55B005206320246059C067E033E06F206020266
:10F56B00E6017801BE01D4046C002206AA026803EE
:10F57B001A0718028005D8007605F405FE0316025B
:10F58B00C402C8012601F403E2063A0368013601FE
:10F59B00CE011202CC072C004E0650011804FC00C1
:10F5AB00F804C00358012A064601A8061004F4010A
:10F5BB00580704025000C801F8049E00E6019A05A2
:10F5CB00BC0274062A03A806C803E60228016E00D3
:10F5DB003802D2054C01EE00E006E4063E03320091
:10F5EB002A009E03D202AA055800560406036C019A
:10F5FB006206EA03B0021204CE045402BA03B80145
:10F60B003A020401E40444073206FC0244033C02C0
:10F61B00E401D206A80716007403140124063801 6E
:10F62B00CC072A011604BE064404F2024E049C05C4
:10F63B00BA03A6022602D000DE033003D000540129
:10F64B0060021002B802020730033A06A603120149
:10F65B00CA04BC024C03A400DC005202B6033801FE
:10F66B00C803A202B403A0000200060012003600 79
:10F67B00A201E605B202920074015C041404FA00C4
:10F68B006A013E03BA03EC04820644044805960261
:10F69B003E06BA05AA027A002C0084018C04A4064B
:10F6AB00AA057A01EA05BE02B600E002A0009E019F
:10F6BB00DA058E0226067204D20734071806C40533
:10F6CB00C802D4013A03AE03C804160500007C013E
:10F6DB0074045C05D202F2019404BC06F2065204D7
:10F6EB0072061403B803E60470060E03A603B003F8
:10F6FB00CE04280536011E035A02CC0122036602F2
:10F70B00F0018E04AA06BC05B0028C006201260330
:10F71B0072031401FA05EE03460290006E014A03D0
:10F72B00DE045805C602CE012803780326023006F4
:10F73B0090052C0100030001BE053A012A037E034C
:10F74B003802660732071206B2059202 3206960598
:10F75B003E013603A203A403AA03BC03F2049406DE
:10F76B007A04EA003A00AE020A061E03D6044005EC
:10F77B007E01F605E203220224066C04C006FE0697
:10F78B007604DE0016004200C6025206F6065E0440
:10F79B0096068004FC0070015003F0048E0668048A
:10F7AB00B406DA060A039A038C036202E4016A04C4
:10F7BB003E057801E405AC0280003E00BA022E063D
:10F7CB008A051A00CA025E071A06CA05DA030A017D
:10F7DB00DC0594023806A8057401D80588021406C6
:10F7EB003C0430054E016604320554017804 68056B
:10F7FB00F6035E02D8014603D20434055A018A048B
:10F80B009E06980544014803D804460590022C0631
:10F81B0084050800940 1BC053401180348029600C6
:10F82B0080001800480063E04360560019C04D407E9
:10F83B003A072A06FA066A04BA06EC0640043C05A7
:10F84B007201D2057601DE059A024A06DE06160320
:10F85B00BE03F804A606B0058C02200660049C06C5
:10F86B0092053201120336026007200 6DC061003F4
:10F87B00AC03C2040404CA071C06D005EC03400207
:10F88B007E003800A801F805E80334025A070E067B
```

-57-

```
:10F89B00A6056E01C605520172045605C002BC00D6
:10F8AB00F202D6014003C003FE04B806E6062E049E
:10F8BB000604D0072E0706068E052600EE02CA01A7
:10F8CB001C035402BA00EC02C4010A031E02180600
:10F8DB0048045405BA02AA00BC0234069C05500128
:10F8EB006C0444058A021A064E046605F0034C02AA
:10F8FB00A200A401EC05C402C80116034202840055
:10F90B004A00DE029A008C01A404EC004000C00205
:10F91B004006C005BC02B000CE026A073E073607A0
:10F92B001E06D605FE03760320021E065A048A061F
:10F93B005C0490066E04C6071006AC058001FC053E
:10F94B00F4035802C601100330024E06EA063A04CD
:10F95B002A053C01300390036E030801D605820291
:10F96B00020606038E036802F601A004E0001C00E9
:10F97B005400FC02F4019A04CE072806F40658043E
:10F98B0084064A045A05CC02E0015E041A050C00F9
:10F99B00A001E005A0025C071406B805A4026807E5
:10F9AB0038072406E8063404180506008E01AA045D
:10F9BB00FE0076016204260530010C0324022A06A0
:10F9CB007E04F6005E011A034E02A800B602220660
:10F9DB006604AE06C805D402F801A604F200520074
:10F9EB00F602E20164042C0542014203C604100432
:10F9FB00EE004600D202760020006001200360 0278
:10FA0B00DE0158040804D60740073C0730070C06F4
:10FA1B00A0055C019004B006CE05E6032E02480655
:10FA2B00D806040388035602C000FE02FA01AC0597
:10FA3B0040088019804C8071606BE05B6029E008E
:10FA4B009801C805580184048C066204A206A4051B
:10FA5B006801B4051C00D00270000E002A007E0164
:10FA6B007A046E06080394037A032C024206C60539
:10FA7B00CE02E60170045005AE0286005000F00283
:10FA8B00D0012E038A035C02D20134039C03920340
:10FA9B0074031A020C062403E80476062003DC0424
:10FAAB005205B402980086019204B606E0061C03C8
:10FABB00D0042E0548015403FC04B206D405F80308
:10FACB006402EA017C0474061A03CA041C051200C2
:10FADB00B20216064204420584020806180 3C40447
:10FAEB000A04DC00100030009001B0051000AC02DD
:10FAFB0004060C03A0039E03980386035002AE007A
:10FB0B00C80258070806940538012403 6C03020148
:10FB1B00C4054C01600420051E00D602820044007F
:10FB2B00CC0264072C0700067C04F0004C00E402B6
:10FB3B00AC00C2024606D205F2035202B400DA024E
:10FB4B008E0068013803A803B603E0045E05D803F2
:10FB5B000401CA055E019604C20704068805140059
:10FB6B00B80228067804E4002800780168043805F8
:10FB7B006601AE050A009A01CE056A01BA052E018F
:10FB8B0006031201F405DC031001EE05CA02DA01CB
:10FB9B004C03E4046A05FC0370030E01E805B8028C
:10FBAB00A400AA01FE05FA036A02FC01B2051600C5
:10FBBB00BE023A06AE0586020E062A03FA04AC060E
:10FBCB00C205C202C20104030C01E205A6026E00CB
:10FBDB0008001800480 0D802880056010203 0601ED
:10FBEB00D0057001CC056401A804F80064012C0356
```

```
:10FBFB0084034A029C009201B6052200E202A60091
:10FC0B00B002100630040C04E2002200660132033D
:10FC1B00960380033E027800260072015604020400C
:10FC2B00C4070A069A054A015A040E04E800340078
:10FC3B009C01D4057C01F005D002EC018204860600
:10FC4B0050046C060203820344028A005C01140315
:10FC5B003C02720014003C00B4021C0654047806EB
:10FC6B002603EE04880656047E06380424052A0073
:10FC7B00FA02EE018804980686050E00A601F2052D
:10FC8B00D602FE01B8052800F402DC015203F6048B
:10FC9B00A0069E0556017E047A062C040004BE06BF
:10FCAB00F8066404A806B6059E02560702068205EE
:10FCBB000200820186049206740 4D80004000C0032
:10FCCB0024006C014403CC0422052400E802B80094
:10FCDB00E602B200D4027C0032009601C205460156
:10FCEB004E03EA047C0632041204F40058010803A4
:10FCFB00180206061203B203D4043A056C01C005C0
:10FD0B0040013C03B403DA044C05A2026207260649
:10FD1B00EE0646044E05A80274001A004E00EA02D5
:10FD2B00BE00F802E80176046205E40328023606F9
:10FD3B00A2056201A204E6002E008A019E04DA00ED
:10FD4B000A001E005A010E032A023C06B405980253
:10FD5B004406CC05E0031C02120636041E051800EF
:10FD6B00C4024C06E4062803F4049A068C05200012
:10FD7B00DC0294007A016E044A059C025006F006E0
:10FD8B004C046005DE031602000600037C033202FE
:10FD9B005406FC067004CC072206E2062203E2049A
:09FDAB006405EA033A026C00024F
:00000001FF
```

Listing 2

```
'          "DBOOT14.BAS" (9-29-93) -- BOOTSTRAPS A 14.7
MHz(!)
DECODED-OUT ST3000
'                         FOR PROGRAMMING THE FLASH EEPROM!

DEFINT I-N: DIM N(255)
    FOR I = 0 TO 255: N(I) = 0: NEXT I
    CLS : BEEP

' THE FOLLOWING DATA LINES ARE DERIVED DIRECTLY FROM
"DBOOT14.HEX"
    DATA
":100040008E0048CC6511973CD72B974A973F8D7B04
    DATA
":10005000883A26FA9749CE01408D7716CB048D72E7
    DATA
":100060005A26FB4D26E818CE0144FC0141C4C0933A
    DATA
":100070004A2737183CCE010018DE4A2A1BCCAA5565
    DATA
":10008000B7D555F7AAAACCA0FFB7D555F7D5578D48
    DATA
":1000900060180918E10026FBFC0141C4C0DD4A2AB2
    DATA
":1000A000078F18CE01008D4918388601F60142C429
    DATA
":1000B0003F8F18A600A700FE014108FF0141180864
    DATA
":1000C0007A01402EA58606972F2083132E20FC96BA
    DATA
":1000D0002F398D1248484848A7008D0AAB00A70069
    DATA
":1000E000089B499749398DE38030810A25028007B2
    DATA     ":0F00F000398640E60018E7000818084A26F53957
    DATA     ":00000001FF

LINELP: READ Z$
    K = VAL("&H" + MID$(Z$, 2, 2)): IF K = 0 GOTO
DATADN
    L = VAL("&H" + MID$(Z$, 4, 4))
    FOR I = 1 TO K: N(L + I - 1) = VAL("&H" +
MID$(Z$, 8 + 2
* I, 2))
    NEXT I: GOTO LINELP
DATADN:

PRINT "Power Unit in Bootstrap Mode, then Press any
Key"
    PRINT
STALL:  IF INKEY$ = "" GOTO STALL

' *** NOW WE ISSUE <BRK> AND 256 CHARACTERS ***
```

-60-

```
              OPEN "COM1:9600,N,8,1,CS0,DS0,CD0" FOR RANDOM AS #1
       DUMP:   IF NOT EOF(1) THEN Z$ = INPUT$(1, 1): GOTO DUMP
       ' *** NOW MAGICALLY CHANGE TO 14400 BAUD ***
              OUT &H3FB, (&H80 OR INP(&H3FB))
  5           OUT &H3F8, 8
              OUT &H3FB, (&H7F AND INP(&H3FB))

PRINT #1, CHR$(255);
              FOR I = 64 TO 255: PRINT #1, CHR$(N(I));
               PRINT USING "\ \"; RIGHT$(HEX$(1024 + N(I)), 2);
 10           IF I MOD 16 = 15 THEN PRINT
              NEXT I: PRINT
              J = 30000
              FOR I = 1 TO 190
       TEST:   IF J <= 0 GOTO NOUNIT
 15           IF EOF(1) THEN J = J - 1: GOTO TEST
              Z$ = INPUT$(1, 1): PRINT "*"; : NEXT I
               CLOSE #1: PRINT

OPEN "COM1:19200,N,8,1,CS0,DS0,CD0" FOR RANDOM AS
       #1
 20    ' *** NOW MAGICALLY CHANGE TO 38.4 BAUD ***
              OUT &H3FB, (&H80 OR INP(&H3FB))
              OUT &H3F8, 3
              OUT &H3FB, (&H7F AND INP(&H3FB))

' *** NOW WE MUST FIND THE APPROPRIATE "???????.HEX"
 25    BOOTSTRAP
       FILE ***
              F$ = COMMAND$: IF F$ <> "" GOTO GOTFIL
       NUTHER: FILES "*.HEX": INPUT "BOOTSTRAP '.HEX' FILE --
       ", F$
 30           IF F$ = "" GOTO NOFILE
       GOTFIL: OPEN "I", 2, F$ + ".HEX"
       FILOOP: IF EOF(2) GOTO FILEDN ELSE LINE INPUT #2, A$
              PRINT #1, A$;
                PRINT A$;
 35             GOSUB GETCHR: GOTO FILOOP
       FILEDN: CLOSE #2
              IF COMMAND$ = "" GOTO NUTHER
               GOTO NOFILE

' *** & NOW WE RECEIVE DATA WHILE WAITING FOR A KEYPRESS
 40    -OR-
       <ACK> ***
       GETCHR:
       RECEIV: IF NOT EOF(1) THEN Z$ = INPUT$(1, 1): IF Z$ <>
       CHR$(6)
 45    THEN PRINT Z$;  ELSE PRINT " <ACK>": RETURN
              IF INKEY$ = "" AND Z$ <> CHR$(3) GOTO RECEIV ELSE
       PRINT :
       RETURN
```

-61-

```
    NOUNIT: PRINT "   -- Bootstrapping Failed -- Start Over!
    --":
    BEEP

NOFILE: CLOSE #1
5   BYEBYE: SYSTEM
```

What is claimed is:

1. A self-contained two-dimensional bar code reader of the type having a housing, a light source for illuminating bar code symbols containing optically encoded data, said bar code symbols including PDF417 bar code symbols having multiple rows of optically encoded data, and a photodetector disposed in said housing for generating electrically encoded data signals in response to light reflected from said bar code symbols, and a decoder disposed in said housing for enabling said reader to decode said bar code symbols, wherein said decoder includes:

a data memory for storing decoded data;

a program memory for storing a decoding program;

a programmable decoding circuit coupled to said data memory and said program memory and responsive to said decoding program and to said electrically encoded data signals for decoding said PDF417 bar code symbols;

said decoding program including:
  a.) a row decoding program for decoding successive rows of optically encoded data read from said bar code symbol to produce decoded character data for storage in said data memory; and
  b.) a message decoding program for placing decoded character data in appropriate positions in a row and column matrix that is representative of said symbol, and for error checking and error correcting said character data as a string of concatenated rows to produce a complete message.

2. The bar code reader of claim 1 in which the decoding of said successive rows proceeds a character-by-character basis.

3. The bar code reader of claim 2 in which said bar code symbols are PDF417 bar code symbols, and in which said row decoding program makes use of the fact that all character data encoded in said symbols start with a space-to-bar transition that Is aligned across the rows of said symbols.

4. The bar code reader of claim 1 in which said programmable decoding circuit includes a microcomputer having an address space not exceeding 64K bytes.

5. The bar code reader of claim 4 in which said program memory comprises a read only memory having a capacity not exceeding 32K bytes.

6. The bar code reader of claim 4 in which said data memory comprises a random access memory having a capacity not exceeding 8K bytes for storing data.

7. In a self-contained two-dimensional bar code reader of the type having a housing, a light source for illuminating bar code symbols containing optically encoded data, said bar code symbols including linear bar code symbols and PDF417 bar code symbols having multiple rows of optically encoded data, and a photodetector disposed in said housing for generating electrically encoded data signals in response to light reflected from said symbol, in combination:

a data memory for storing decoded data;

a program memory for storing a decoding program for enabling said reader to decode linear bar code symbols when said bar code symbols are linear bar code symbols and to decode PDF417 bar code symbols when said bar code symbol are PDF417 bar code symbols, said decoding program including:
  a.) a row decoding program for decoding successive rows of optically encoded data read from said bar code symbol to produce decoded character data for storage in said data memory; and
  b.) a message decoding program for placing decoded character data in appropriate positions in a row and column matrix that is representative of said symbol, and for error checking and error correcting said character data as a string of concatenated rows to produce a complete message; and programmable means connected to said program memory and said data memory and responsive to said decoding program and to said electrically encoded data signals for executing said decoding program.

8. The bar code of reader of claim 7 in which the decoding of said successive rows occurs on a character-by-character basis.

9. The bar code reader of claim 7 in which said bar code symbols are PDF417 bar code symbols, and in which said row decoding program makes use of the fact that all character data encoded in said symbols start with a space-to-bar transition.

10. The bar code reader of claim 7 in which said programmable decoding circuit includes a microcomputer having an address space not exceeding 64K bytes.

11. The bar code reader of claim 10 in which said program memory comprises a read only memory having a capacity not exceeding 32K bytes.

12. The bar code reader of claim 10 in which said data memory comprises a random access memory having a capacity not exceeding 8K bytes for storing data.

* * * * *